(12) United States Patent
Kinoshita et al.

(10) Patent No.: US 8,726,175 B2
(45) Date of Patent: May 13, 2014

(54) USER INTERFACE GENERATION APPARATUS

(75) Inventors: Kenta Kinoshita, Yokohama (JP); Kazuhiro Yamamoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 305 days.

(21) Appl. No.: 12/919,351

(22) PCT Filed: Feb. 23, 2009

(86) PCT No.: PCT/JP2009/053227
§ 371 (c)(1),
(2), (4) Date: Aug. 25, 2010

(87) PCT Pub. No.: WO2009/107589
PCT Pub. Date: Sep. 3, 2009

(65) Prior Publication Data
US 2011/0022974 A1  Jan. 27, 2011

(30) Foreign Application Priority Data

Feb. 27, 2008  (JP) ................................ 2008-045726
Mar. 28, 2008  (JP) ................................ 2008-088248

(51) Int. Cl.
*G06F 3/048* (2013.01)
(52) U.S. Cl.
USPC ........... 715/762; 715/765; 715/835; 715/781; 715/810; 345/169
(58) Field of Classification Search
USPC ......... 715/716, 717, 763, 764, 765, 781, 810, 715/835, 846, 864, 700, 744, 762; 345/169, 345/173; 379/93.19, 102.01–102.06; 455/422.1
See application file for complete search history.

(56) References Cited

U.S. PATENT DOCUMENTS

| 5,657,221 | A   | * | 8/1997 | Warman et al. | ................. 700/83 |
| 6,198,481 | B1  | * | 3/2001 | Urano et al. | .................. 715/835 |
| 6,765,590 | B1  |   | 7/2004 | Watahiki et al. | |
| 7,681,128 | B2  | * | 3/2010 | Yamamoto et al. | ........... 715/717 |

(Continued)

FOREIGN PATENT DOCUMENTS

| JP | A 2001-036652  | 2/2001 |
| JP | A-2001-069580  | 3/2001 |

(Continued)

OTHER PUBLICATIONS

International Search Report issued in corresponding International Application No. PCT/JP2009/053227, mailed Apr. 7, 2009. (with English-language translation).
Jun. 26, 2012 Office Action issued in Japanese Patent Application No. 2010-500681 (with translation).

(Continued)

*Primary Examiner* — Xiomar L Bautista
(74) *Attorney, Agent, or Firm* — Oliff PLC

(57) ABSTRACT

A user interface generation apparatus is provided with a user interface generation unit for generating a user interface, a display unit for displaying the user interface generated by the user interface generation unit, and a memory unit for storing a definition file including object definition information which defines an object, which is a component of the user interface. If being instructed to generate a plurality of user interfaces, the user interface generation unit makes a selection from object definition information included in the definition file stored in the memory unit and executes processing to generate a compound user interface based on the object definition information selected.

12 Claims, 15 Drawing Sheets

(56) References Cited

U.S. PATENT DOCUMENTS

| | | | |
|---|---|---|---|
| 2002/0047945 A1* | 4/2002 | Tanigawa et al. | 348/734 |
| 2003/0103075 A1* | 6/2003 | Rosselot | 345/717 |
| 2003/0103088 A1* | 6/2003 | Dresti et al. | 345/835 |
| 2005/0096812 A1 | 5/2005 | Nezu et al. | |
| 2008/0016468 A1* | 1/2008 | Chambers et al. | 715/835 |
| 2008/0100591 A1 | 5/2008 | Nezu et al. | |
| 2008/0282182 A1* | 11/2008 | Oosaka | 715/772 |
| 2009/0070692 A1* | 3/2009 | Dawes et al. | 715/764 |
| 2009/0187580 A1* | 7/2009 | Schirmer et al. | 707/100 |
| 2011/0161865 A1* | 6/2011 | Josephsoon et al. | 715/784 |
| 2012/0151392 A1* | 6/2012 | Takahashi et al. | 715/764 |

FOREIGN PATENT DOCUMENTS

| | | |
|---|---|---|
| JP | A-2002-278666 | 9/2002 |
| JP | A 2005-096596 | 4/2005 |
| JP | A 2006-350819 | 12/2006 |
| JP | A 2007-066099 | 3/2007 |
| JP | A-2007-116270 | 5/2007 |
| KR | 10-2005-0030612 A | 3/2005 |

OTHER PUBLICATIONS

Feb. 6, 2012 Office Action issued in Korean Patent Application No. 10-2010-7018957 (with translation).

* cited by examiner

FIG. 2

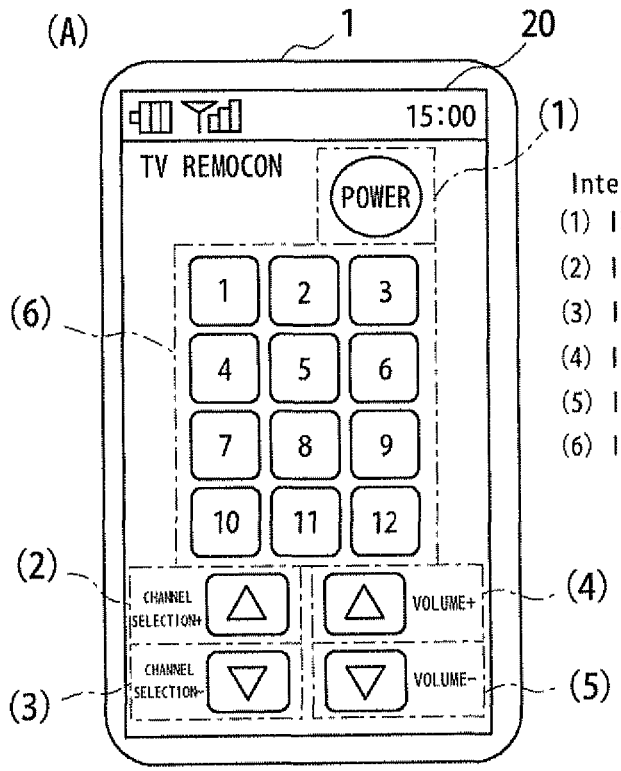

(A)

Interface id= "TV1_interface"
(1) ID= "switch1" priority= "0"
(2) ID= "select_up" priority= "1"
(3) ID= "select_down" priority= "1"
(4) ID= "volume_up" priority= "1"
(5) ID= "volume_down" priority= "1"
(6) ID= "10key" priority= "3"

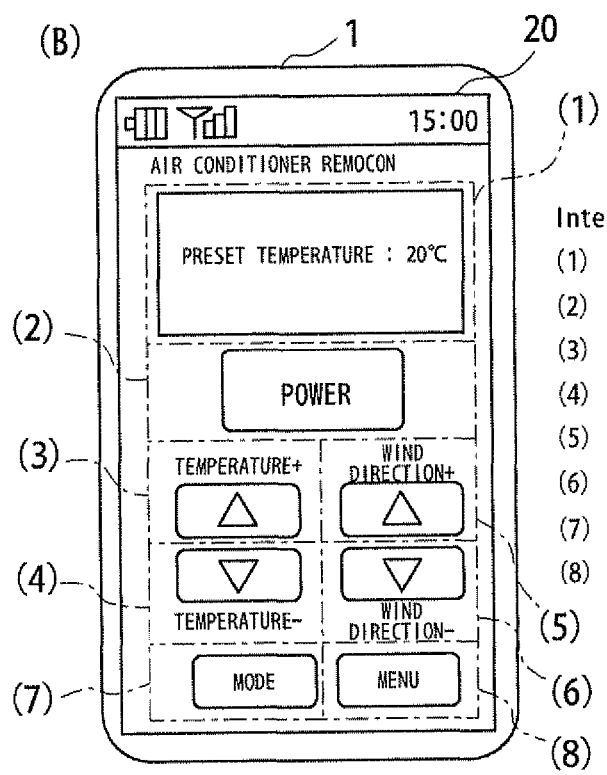

(B)

Interface id= "AIR1_interface"
(1) ID= "set_window" priority= "0"
(2) ID= "switch2" priority= "0"
(3) ID= "set_up" priority= "1"
(4) ID= "set_down" priority= "1"
(5) ID= "wind_up" priority= "5"
(6) ID= "wind_down" priority= "5"
(7) ID= "mode_change" priority= "2"
(8) ID= "menu" priority= "2"

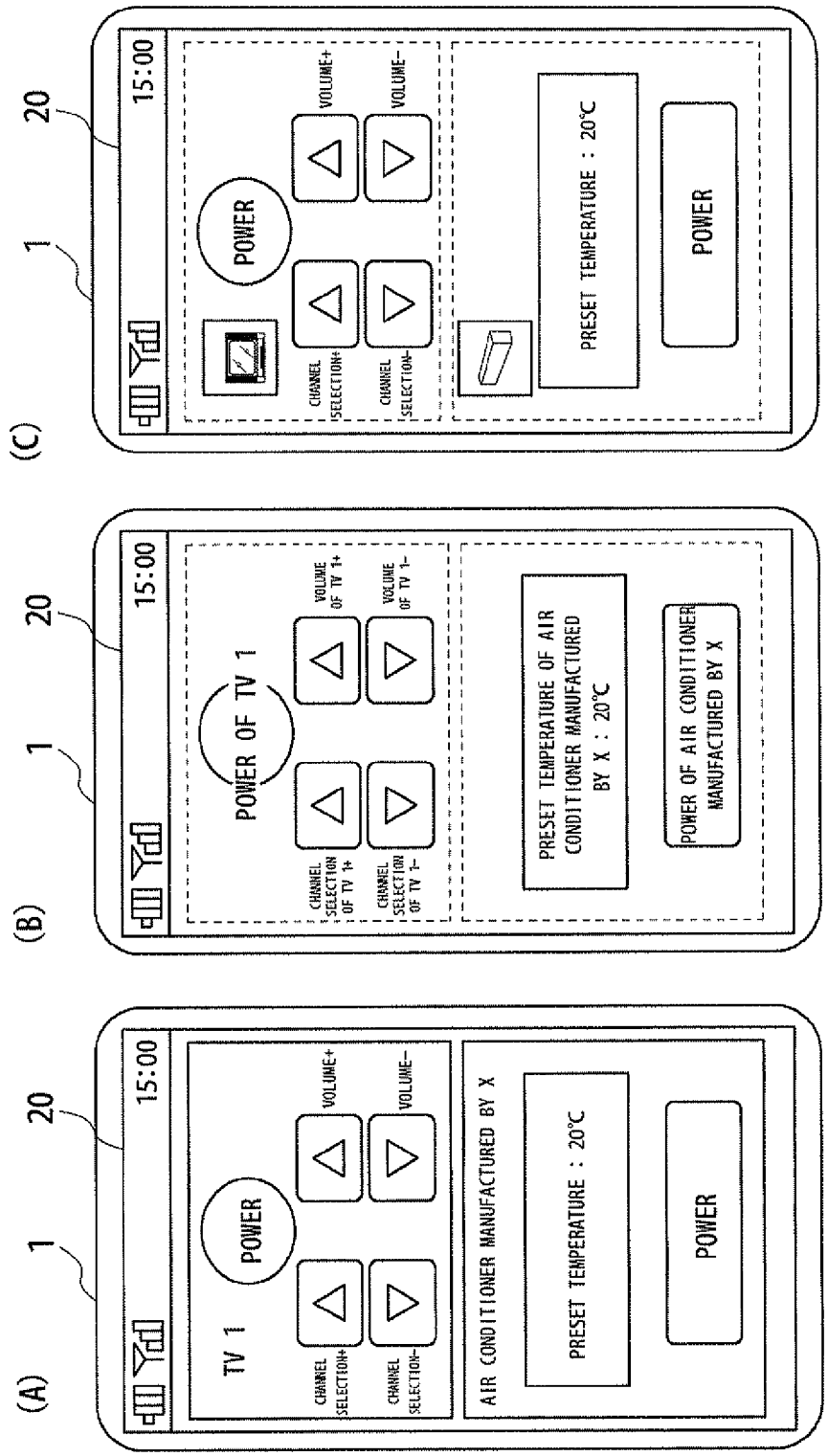

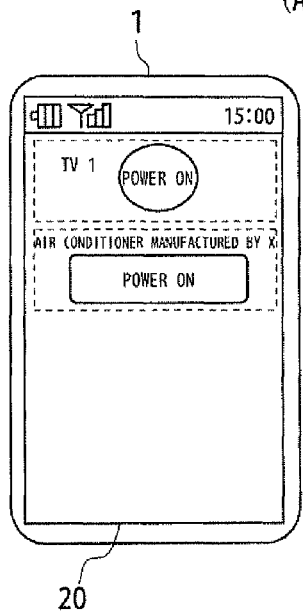

Interface id= "TV1_interface" particular_name= "TV 1"
(1) ID= "switchON" priority= "0" com_effect= "YES" text= "POWER ON"
(2) ID= "select_up" priority= "1" com_effect= "NO" text= "CHANNEL SELECTION+"
(3) ID= "select_down" priority= "1" com_effect= "NO" text= "CHANNEL SELECTION−"
(4) ID= "volume_up" priority= "1" com_effect= "NO" text= "VOLUME+"
(5) ID= "volume_down" priority= "1" com_effect= "NO" text= "VOLUME−"
(6) ID= "10key" priority= "3" com_effect= "NO"
(7) ID= "switchOFF" priority= "0" com_effect= "NO" text= "POWER OFF"

Interface id= "AIR1_interface"
            particular_name= "AIR CONDITIONER MANUFACTURED BY X"
(1) ID= "set_window" priority= "0" com_effect= "NO"
(2) ID= "switchON" priority= "0" [com_effect= "YES"] text= "POWER ON"
(3) ID= "set_up" priority= "1" com_effect= "NO" text= "TEMPERATURE+"
(4) ID= "set_down" priority= "1" com_effect= "NO" text= "TEMPERATURE−"
(5) ID= "wind_up" priority= "5" com_effect= "NO" text= "WIND DIRECTION+"
(6) ID= "wind_down" priority= "5" com_effect= "NO" text= "WIND DIRECTION−"
(7) ID= "mode_change" priority= "2" com_effect= "NO" text= "MODE"
(8) ID= "menu" priority= "5" com_effect= "NO" text= "MENU"
(9) ID= "switchOFF" priority= "0" com_effect= "NO" text= "POWER OFF"

(B)

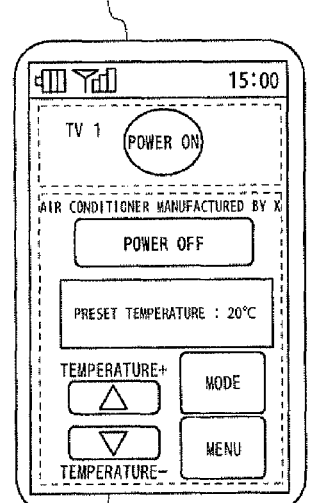

Interface id= "TV1_interface" particular_name= "TV 1"
(1) ID= "switchON" priority= "0" com_effect= "YES" text= "POWER ON"
(2) ID= "select_up" priority= "1" com_effect= "NO" text= "CHANNEL SELECTION+"
(3) ID= "select_down" priority= "1" com_effect= "NO" text= "CHANNEL SELECTION−"
(4) ID= "volume_up" priority= "1" com_effect= "NO" text= "VOLUME+"
(5) ID= "volume_down" priority= "1" com_effect= "NO" text= "VOLUME−"
(6) ID= "10key" priority= "3" com_effect= "NO"
(7) ID= "switchOFF" priority= "0" com_effect= "NO" text= "POWER OFF"

Interface id= "AIR1_interface"
            particular_name= "AIR CONDITIONER MANUFACTURED BY X"
(1) ID= "set_window" priority= "0" [com_effect= "YES"]
(2) ID= "switch ON" priority= "0" [com_effect= "NO"] text= "POWER ON"
(3) ID= "set_up" priority= "1" [com_effect= "YES"] text= "TEMPERATURE+"
(4) ID= "set_down" priority= "1" [com_effect= "YES"] text= "TEMPERATURE−"
(5) ID= "wind_up" priority= "5" com_effect= "NO" text= "WIND DIRECTION+"
(6) ID= "wind_down" priority= "5" com_effect= "NO" text= "WIND DIRECTION−"
(7) ID= "mode_change" priority= "2" [com_effect= "YES"] text= "MODE"
(8) ID= "menu" priority= "2" [com_effect= "YES"] text= "MENU"
(9) ID= "switchOFF" priority= "0" [com_effect= "YES"] text= "POWER OFF"

FIG. 13

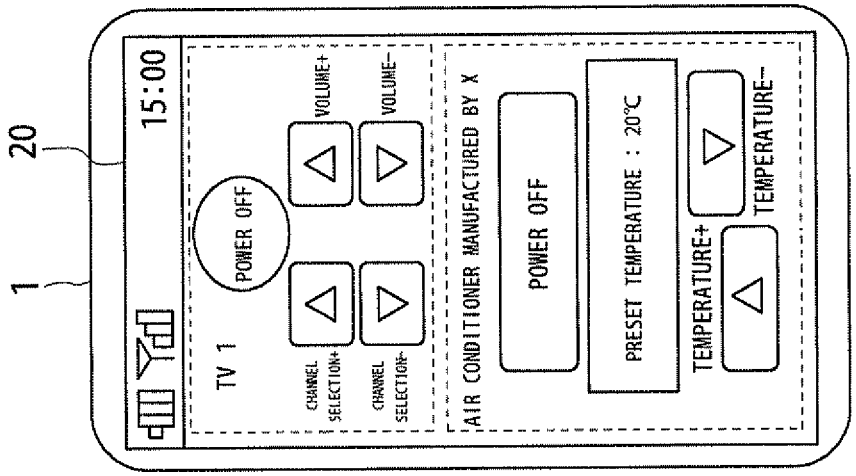

Interface id= "TV1_interface" particular_name= "TV 1"
(1) ID= "switch ON" priority= "0" text= "POWER ON"
(2) ID= "select_up" priority= "1" text= "CHANNEL SELECTION+" relate_ID= "select_1"
(3) ID= "select_down" priority= "1" text= "CHANNEL SELECTION-" relate_ID= "select_1"
(4) ID= "volume_up" priority= "1" text= "VOLUME+" relate_ID= "volume_1"
(5) ID= "volume_down" priority= "1" text= "VOLUME-" relate_ID= "volume_1"
(6) ID= "10key" priority= "3"
(7) ID= "switch OFF" priority= "0" text= "POWER OFF"

Interface id= "AIR1_interface" particular_name= "AIR CONDITIONER MANUFACTURED BY X"
(1) ID= "set_window" priority= "0"
(2) ID= "switch ON" priority= "0" text= "POWER ON"
(3) ID= "set_up" priority= "1" text= "TEMPERATURE+" [relate_ID= "set_1"]
(4) ID= "set_dwwn" priority= "1" text= "TEMPERATURE-" [relate_ID= "set_1"]
(5) ID= "wind_up" priority= "5" text= "WIND DIRECTION+" relate_ID= "wind_1"
(6) ID= "wind_down" priority= "5" text= "WIND DIRECTION-" relate_ID= "wind_1"
(7) ID= "mode_change" priority= "2" text= "MODE"
(8) ID= "menu" priority= "2" text= "MENU"
(9) ID= "switch OFF" priority= "0" text= "POWER OFF"

FIG. 14
(A)
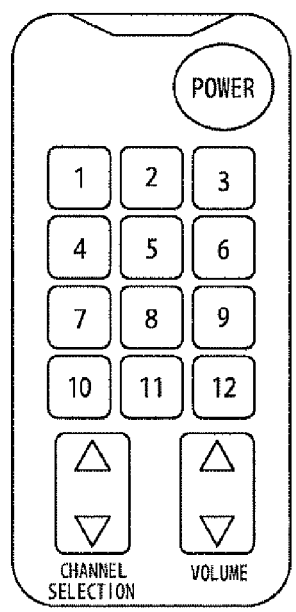
(B)
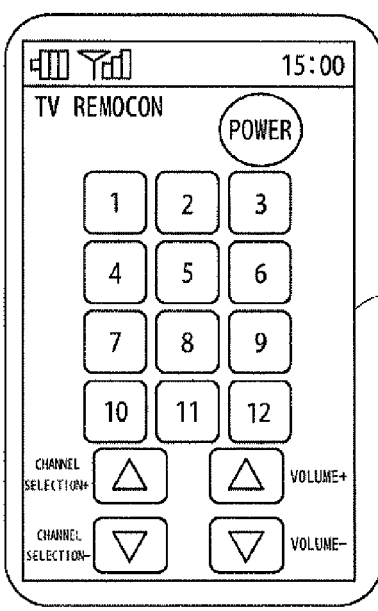
(C)
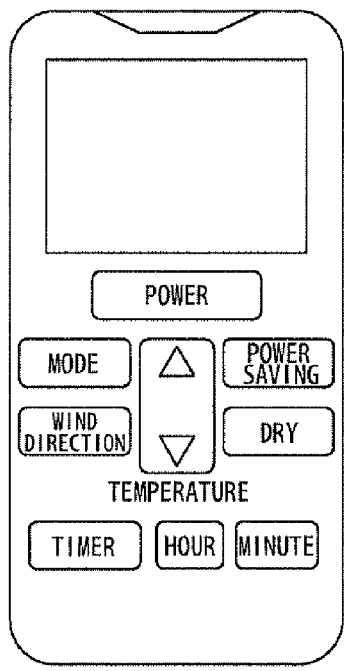
(D)
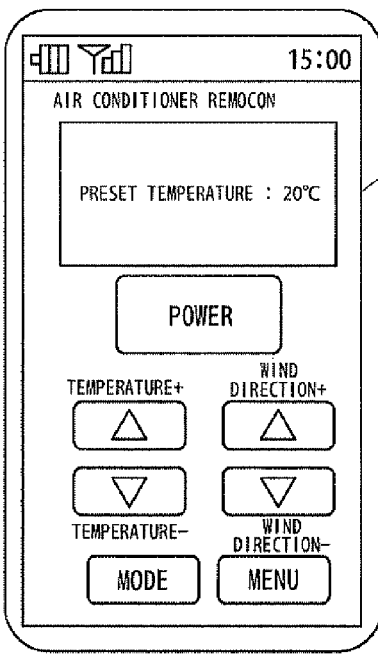

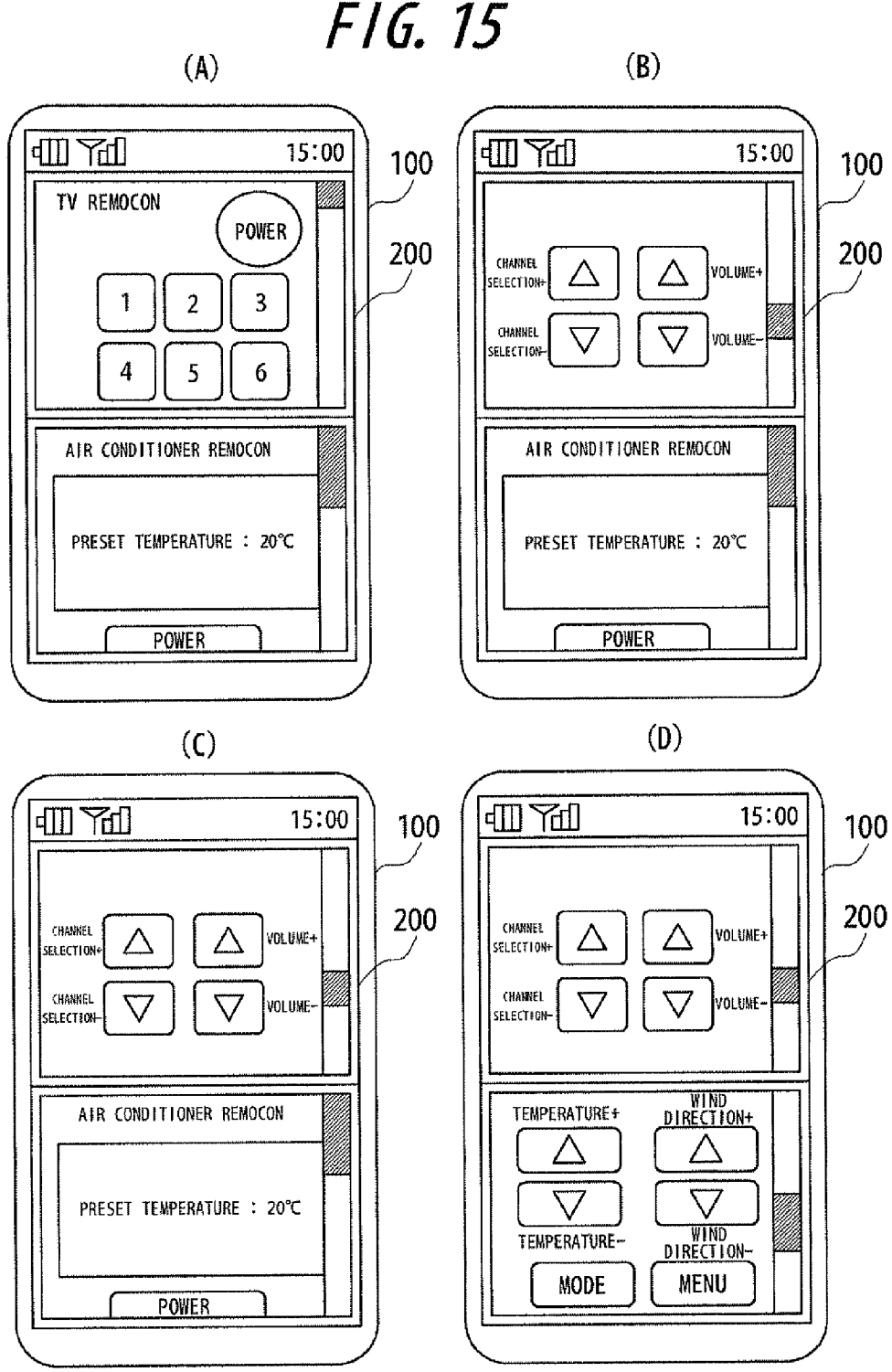

USER INTERFACE GENERATION APPARATUS

CROSS REFERENCE TO RELATED APPLICATIONS

This application claims priority to and the benefit of Japanese Patent Application No. 2008-45726 filed on Feb. 27, 2008 and Japanese Patent Application No. 2008-88248 filed on Mar. 28, 2008, the entire contents of which are incorporated herein by reference.

TECHNICAL FIELD

The present invention relates to user interface generation apparatuses, and particularly to user interface generation apparatuses for generating user interface of mobile terminals.

BACKGROUND ART

The user interface (hereinafter, arbitrarily abbreviated to "UI") of the mobile terminal represented by a mobile phone has a great influence on operability when a user operates the mobile terminal. Accordingly, the UI of the mobile terminal is one of important factors for the user to purchase the mobile terminal.

With significant multi-functioning of the mobile terminal in recent years, there are numerous mobile terminals having picturesque UI using animation and 3D. In addition, there are mobile terminals having the UI which can be customized as desired by users. Such mobile terminals dramatically improve convenience for the users.

Conventional mobile terminals generally have UI designs and operation methods which are different between manufacturers and models. That is, the UI is unique to each terminal and most of the conventional mobile terminals have UI highly dependent on models. Therefore, when program codes of another terminal are reused in developing a terminal, it leads to voluminous change in parts of the UI to the program codes. Accordingly, it has been difficult to port program codes of a terminal to another terminal.

In order to deal with such a problem, a UI based on XML (Extensible Markup Language) has been introduced. Expressing the UI by using an XML file whose description method is standardized facilitates reuse of the program codes and enables to port the UI to another model. Accordingly, it also enables to deal with UI alone independently from each terminal, such that the UI can be used by terminals of different models and different manufactures.

Representatives of such XML-based UI are UI Foundation developed by TAT (http://www.tat.se), VIVID UI developed by Acrodea, Inc. (http://www.acrodea.co.jp/), UI One developed by Qualcomm Incorporated (http://www.qualcomm.co.jp/) and the like.

In addition, with multi-functioning and high-performance of a terminal body, an increasing number of recent mobile terminals mount OS (Operating System) which can perform a multi-task processing for simultaneously executing a plurality of tasks in parallel. Moreover, mobile terminals with multi-window function to multiplex output screen displays by allocating each of the plurality of tasks processed in parallel and simultaneously to an individual display area (window), have been becoming widely used.

Incidentally, Japanese Patent Laid-Open No. 2001-36652 discloses a scheme of remote handling (control) of a plurality of external equipments by infrared communication using a mobile phone terminal having an infrared communication unit. The mobile phone terminal described in Japanese Patent Laid-Open No. 2001-36652 is provided with an external control unit for communicating with the external equipments. This mobile phone terminal stores the external equipment control information for remotely controlling the external equipments, obtained via a telephone line or received from the external equipments, and remotely controls the external equipments based on the external equipment control information. That is, by changing an application program (hereinafter, referred to as "application" simply) included in the terminal, the terminal body, which is normally used as the mobile phone, can be used as a remote controller (hereinafter, referred to as "remocon" simply) for remotely controlling the plurality of external equipments.

SUMMARY OF INVENTION

Technical Problem

According to the mobile phone terminal disclosed in the above Japanese Patent Laid-Open No. 2001-36652, a single mobile phone terminal can remotely control the plurality of external equipments based on respective external equipment control information corresponding to the external equipments. Therefore, there is no need to do cumbersome operation for the user to separately use individual remocon terminals for the plurality of external equipments, which improves convenience for the user.

If such functions of the remocon to remotely switch between the plurality of external equipments to be controlled remotely is implemented in the mobile terminal capable of multi-task processing stated above, it is not necessary to finish a remocon application to initiate another remocon application. That is, it is possible to initiate a plurality of applications on a single terminal and to use a desired remocon application among them timely.

However, operations to switch the plurality of applications frequently is cumbersome.

If the multi-windows function stated above is embedded in the mobile terminal, UIs for operating the plurality of applications can be displayed on the plurality of windows, respectively. Thereby, it is possible to use the applications on a single screen simultaneously without switching among the plurality of applications.

For a TV remocon terminal alone as shown in FIG. 14(A), for example, UI of TV remocon application may be reproduced on a touch panel 200 of a mobile terminal 100, for example, while maintaining operability of the TV remocon terminal, as shown in FIG. 14(B). Similarly, for an air conditioner remocon terminal alone as shown in FIG. 14(C), UI of air conditioner remocon application may be reproduced on the touch panel 200 of the mobile terminal 100, while maintaining operability of the air conditioner remocon terminal, as shown in FIG. 14(D). Moreover, if each UI of application is described in XML as the basis, almost the same UI can be easily reproduced in another terminal only by processing the XML file describing the UI, even if the application is ported to the another terminal of a different manufacturer.

However, in order to operate an air conditioner while viewing a TV in the above example, the applications for both the TV and the air conditioner may be displayed sharing a display area of the display unit by using the multi-task function and the multi-window function, as both the TV and the air conditioner need frequent operation. In such a case, since each application has the UI which assumed to be used solely, simultaneous display of the UIs results in states shown in FIG. 15(A) to (D).

FIG. 15(A) to (D) are diagrams illustrating states when the UIs of two applications are simultaneously displayed on the mobile terminal 100 having the multi-task function and the multi-window function. In the examples shown in the figures, only a part of each UI is displayed, as each of the UIs is reproduced as it stands in each of the windows vertically separating the display unit of the touch panel 200. A scroll bar is provided on the right in each window so as to enable operation of parts beyond the screen.

In order to adjust volume of the TV in a state shown as FIG. 15(A), for example, the user needs to move the scroll bar in the window of the TV remocon UI so as to move a displayed area of the TV remocon UI, as shown in FIG. 15(B). Similarly, in order to adjust temperature of the air conditioner in a state shown as FIG. 15(C), for example, the user needs to move the scroll bar in the window of the air conditioner remocon UI so as to move a displayed area of the air conditioner remocon UI, as shown in FIG. 15(D). Moreover, when initiating a plurality of applications by using the multi-window function, and if UIs are displayed being overlapped with one another, it is necessary to select and activate the window to be input before starting input.

The terminal body of the mobile terminal in particular is designed to be compact, thus an area usable by either UI constituted of the touch panel or UI constituted of physical keys is very limited. Therefore, an operation unit constituting the UI of the application such as the remocon is generally designed in a minimum size. Accordingly, it is not realistic to shrink each UI entirely in order to display the UIs of the plurality of applications at the same time.

As set forth above, if the UIs designed to occupy an entire screen is displayed by using the multi-window function, operability of UIs is spoiled.

It is an object of the present invention in consideration of such conditions to provide a user interface generation apparatus capable of simultaneously achieving user interfaces of the plurality of application programs, as well as maintaining the operability of each of the user interfaces.

Solution To Problem

In order to achieve the above object, a user interface generation apparatus according to a first aspect is characterized in including:

an application program execution unit for implementing a variety of functions based on an application program;

a user interface generation unit for generating a user interface for instructing the application program execution unit to execute a predetermined function based on the application program;

a display unit for displaying the user interface generated by the user interface generation unit; and a memory unit for storing a user interface definition file including user interface object definition information for defining a user interface object, which is a component of the user interface, wherein the user interface generation unit, if it is instructed to generate a plurality of user interfaces, makes a selection from the user interface object definition information included in the user interface definition file stored in the memory unit correspondingly to each of the plurality of user interfaces instructed, and executes user interface compound processing to generate a compound user interface based on the user interface object definition information selected.

A second aspect of the present invention is that, in the user interface generation apparatus according to the first aspect, the user interface object definition information includes user interface object attribute information indicating a relationship between the user interface object and another user interface object included in the user interface including the user interface object, and the user interface generation unit, if it is instructed to generate the plurality of user interfaces, makes a selection from the user interface object definition information based on a predetermined display area of the display unit for displaying the user interface and the user interface object attribute information.

A third aspect of the present invention is that, in the user interface generation apparatus according to the second aspect, the user interface object definition information further includes user interface object attribute information indicating whether each user interface object constituting the user interface is enabled or disabled, and the user interface generation unit, if it is instructed to generate the plurality of user interfaces, makes a selection from the user interface object definition information based on a predetermined display area of the display unit for displaying the user interface and the user interface object attribute information.

A fourth aspect of the present invention is that, in the user interface generation apparatus according to any one of the first to the third aspects, the user interface definition file includes identification information to identify the user interface generated based on the user interface definition file, and the user interface generation unit processes the user interface object definition information selected, based on the identification information.

A fifth aspect of the present invention is that, in the user interface generation apparatus according to any one of the first to the fourth aspects, the user interface object definition information includes action information indicating contents of operation to be executed at occurrence of an event to the user interface object, the action information includes information on change in the user interface object attribute information included in another user interface object definition information, and the user interface generation unit, if the event is occurred on the compound user interface and the user interface object attribute information is changed based on the action information included in the user interface object definition information of the user interface object which received occurrence of the event, executes user interface compound processing based on the user interface object attribute information changed, so as to generate a new compound user interface.

BRIEF DESCRIPTION OF DRAWINGS

FIG. 2 shows diagrams illustrating priority, which is user interface object attribute information, according to the first embodiment;

FIG. 9 shows diagrams illustrating an example in which two user interfaces are compounded according to the second embodiment;

FIG. 10 shows diagrams illustrating compound of the user interface by using information indicating whether the user interface object, which is the user interface object attribute information, is enabled/disabled according to a third embodiment;

FIG. 13 is a diagram illustrating attribute information for updating the user interfaces according to the third embodiment;

FIG. 14 shows diagrams illustrating conventional remote controllers reproduced by the user interface of a mobile terminal; and FIG. 15 shows diagrams illustrating examples of conventional compound of two user interfaces by the mobile terminal.

REFERENCE SIGNS LIST

Figure 1:
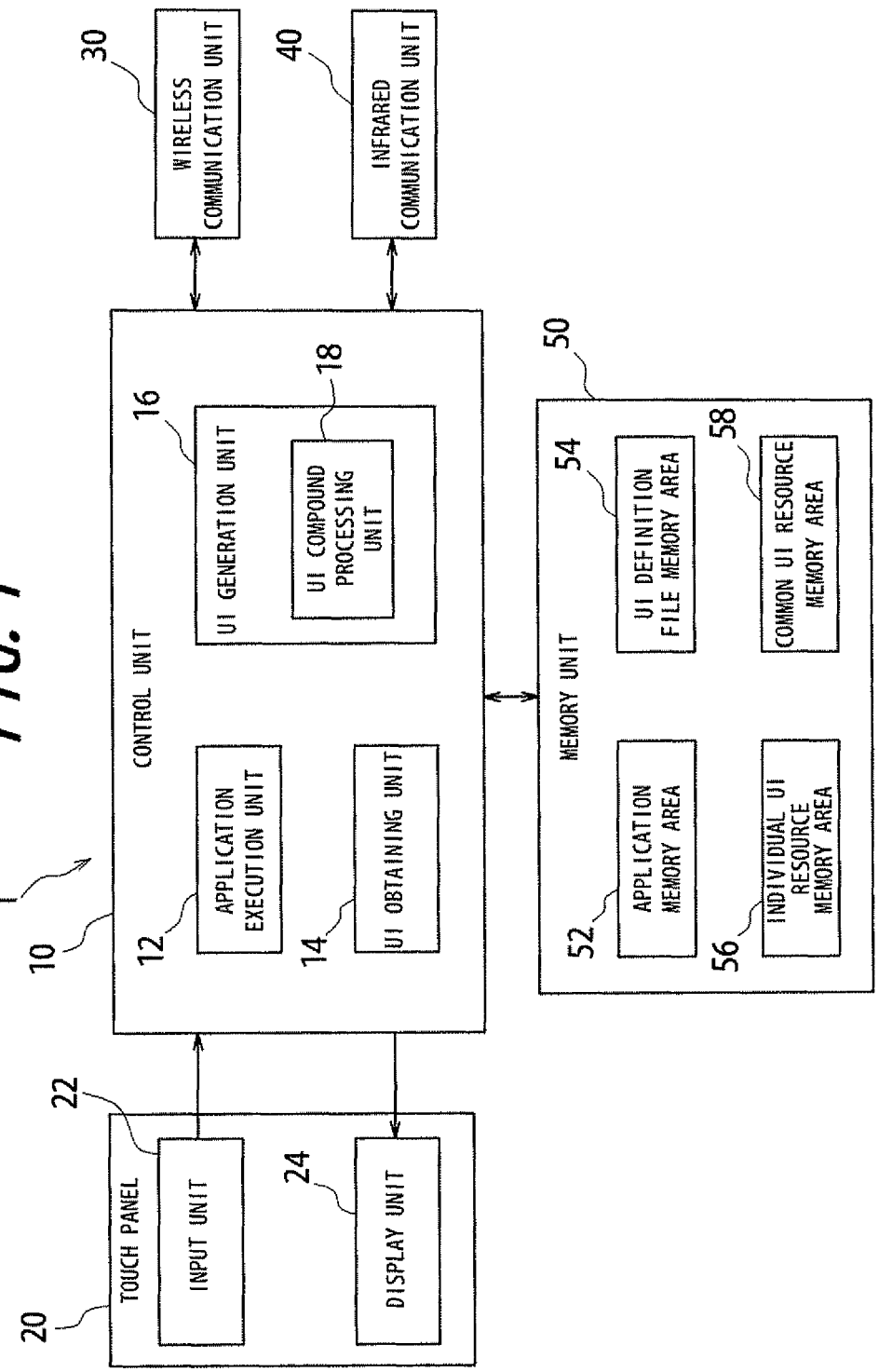
FIG. 1 is a block diagram illustrating a schematic configuration of a user interface generation apparatus according to a first embodiment.

1 user interface generation unit
10 control unit
12 application program execution unit
14 user interface obtaining unit
16 user interface generation unit
18 user interface compound processing unit
20 touch panel
22 input unit
24 display unit
30 wireless communication unit
40 infrared communication unit
50 memory unit
52 application program memory area
54 user interface definition file memory area
56 individual user interface resource memory area
58 common user interface resource memory area

DESCRIPTION OF EMBODIMENTS

Embodiments of the present invention will be described with reference to the accompanying drawings. In each of the embodiments described below, a mobile phone having remote control functions for remotely controlling various external apparatuses is used as an example of a user interface (hereinafter, referred to as "UI") according to the present invention. However, the UI generation apparatus according to the present invention is not limited to the mobile phone but may be applicable to any mobile terminals such as, for example, a laptop computer, PDA and the like. In addition, the UI generation apparatus according to the present invention is also applicable to an apparatus which needs to mount it, even if it is not a mobile terminal. It is to be noted that the present invention primarily intends to compound a plurality of UIs to be used simultaneously. Therefore, an application instructed by each UI is not limited to a remote control function but the present invention may be applicable to various kinds of applications.

(First Embodiment)

FIG. 1 is a block diagram illustrating a schematic configuration of a UI generation apparatus according to a first embodiment of the present invention.

A mobile phone 1 includes a control unit 10 for controlling the overall operation and a touch panel 20 for receiving input by a user and for displaying a result of input and the like depending on each application. The touch panel 20 has an input unit 22 constituted of matrix switches and the like to receive input by the user and arranged on top of a display unit 24 constituted of a liquid crystal display and the like. The display unit 24 displays according to an application program and also displays an image of UI for receiving input by the user in a UI display area.

In addition, the mobile phone 1 includes a wireless communication unit 30 for transmitting and receiving various information such as voice call, data of e-mail and the like with a base station (not shown) and an infrared communication unit 40 for communicating with various external equipments (not shown) by using infrared rays. The mobile phone 1 transmits and receives a variety of data with the external equipments by using the wireless communication unit 30 via the internet, by radio and the like.

The mobile phone 1 further includes a memory unit 50 for storing input information and various applications and also for functioning as a work memory. The memory unit 50 includes an application memory area 52, a UI definition file memory area 54, an individual UI resource memory area 56, and a common UI resource memory area 58. The application memory area 52 stores various applications. The UI definition file memory area 54 stores a UI definition file which defines a sequence of generation rules for generating each UI overall. The individual UI resource memory area 56 stores individual UI resources such as image data and character string (text) data used for generating the UI unique to each application. The common UI resource memory area 58 stores common UI resources such as image data and font data used commonly by UIs used by the terminal, other than the individual UI resource unique to each application. When the UI is actually generated, the image data and the text data stored in the individual UI resource memory area 56 and the common UI resource memory area 58 are displayed on the display unit 24 of the touch panel 20.

The control unit 10 includes an application execution unit 12, a UI obtaining unit 14 and a UI generation unit 16. The application execution unit 12 executes various applications stored in the application memory area 52 of the memory unit 50, as well as controlling such execution. In addition, the application execution unit 12, based on input to the UI corresponding to the application stored in the application memory area 52, executes functions of the application corresponding to the input. The UI obtaining unit 14 obtains resource (image data and the like) and a UI definition file (XML file and the like) from outside the terminal via the wireless communication unit 30. The UI generation unit 16 performs parsing process and DOM (Document Object Model) process on the UI definition file, and generates the UI to be used actually. The UI generation unit 16 interprets information of the UI, described in an XML form, by using an XML engine and displays the UI generated based on the UI definition file on the display unit 24 of the touch panel 20.

In addition, the UI generation unit 16 includes a UI compound processing unit 18. The UI compound processing unit 18, when instructed to compound a plurality of UIs, compounds the UIs in accordance with a plurality of specified UI definition files.

Next, the UI definition file stored in the UI definition file memory area 54 according to the present embodiment is further described.

The UI definition file memory area 54 of the memory unit 50 stores the UI definition file defining a specification and an operation of an application of the UI necessary for execution of the application stored in the application memory area 52. Although the same UI may be used by different applications, here it is assumed that the UI used by each application differs from one another, for convenience of description, and that the UI definition files corresponding to the applications are stored. For example, a TV remocon UI definition file is stored in the UI definition file memory area 54, correspondingly to a TV remocon application for remotely controlling a TV set (not shown), which is the external equipment, by using the mobile phone 1. Similarly, an air conditioner remocon UI definition file is stored in the UI definition file memory area 54, correspondingly to an air conditioner remocon application for remotely controlling an air conditioner (not shown), which is another external equipment, by using the mobile phone 1.

In the present embodiment, a UIML (User Interface Markup Language) form based on XML language is used as an example of a language to describe the UI definition file. In accordance with a definition described in the UIML form, the UI generation unit 16 displays the UI on the display unit 24 of the touch panel 20 of the mobile phone 1 and the application execution unit 12 executes processing based on input to the input unit 22 by the user.

The UI definition file according to the present embodiment includes UI object definition information which defines UI object to be shown on the display unit 24. The UI object definition information is information defining an image and a text for showing the UI object such as keys and buttons, which are components of the UI to be displayed on the display unit 24, and is information defining an operation when there is input to the UI object (in practice, when there is input to a part of the input unit 22 corresponding to the UI object).

According to the present embodiment, as the information defining the operation when there is input to the input unit 22 corresponding to a position of the UI object, an action information, indicating contents of the operation to be executed by each application execution unit if an event is occurred to each UI object, is included in the UI object definition information. For example, if an event to input to the input unit 22 corresponding to a position of the UI object of "Power" on the TV remocon UI is occurred, the action information defines to issue an instruction to TV remocon application to transmit an infrared signal to turn on or off a power of the TV as the external equipment.

Moreover, the UI object definition information also includes UI object attribute information, which is information on each UI object used for compounding a plurality of UIs. According to the present embodiment, as the UI object attribute information, priority to display each object in compounding the plurality of UIs is defined in advance based on a relationship between each UI object and other UI objects.

FIG. 2 is a diagram illustrating information on the priority, which is the UI object attribute information, according to the present embodiment.

FIG. 2(A) shows the mobile phone 1 which initiates only the TV remocon application and displays the TV remocon UI on the touch panel 20 based on the TV remocon UI definition file. In the figure, chain lines conceptually separate the UI display area on the touch panel 20 into small areas corresponding to the respective UI object attribute information, and respective UI object information corresponding to the small areas is listed on the right. Definition (UI identification information) to handle a plurality of UI objects as a single UI is indicated with a tag of interface. With a value "TV_interface", it may be specified that it is the UI of a remocon of a TV1. In an example shown in FIG. 2(A), it is possible to remotely operate (control) the TV set identified as the TV1 by using the UI of the remocon of the TV1.

According to the present embodiment, as the UI object attribute information, priority of the UI object of each of the small areas stated above is defined as a value of priority in advance. In the example shown in FIG. 2, the UI object with the priority value 0 is an essential object, and the UI object with the priority value 1 is an important object. As the value of the priority increases, the UI object is less prioritized. That is, for example, since a "Power" key shown in a small area (1) in FIG. 2(A) is the essential object, its priority value is set to 0. Channel selection keys in small areas (2) and (3) and volume adjusting keys in small areas (4) and (5) are important keys, and thus their priority values are set to 1. However, since the numerical keypad in a small area (6) may be substituted by the channel selection keys in the small areas (2) and (3), its priority values are 3 to have low priority.

Similarly, FIG. 2(B) shows the mobile phone 1 which displays only the air conditioner remocon UI on the touch panel 20. For the air conditioner remocon UI, since "Preset Temperature" shown in a small area (1), for example, and a "Power" key shown in a small area (2) are essential, their priority values are set to 0. Temperature up and down selection keys in small areas (3) and (4) are important keys, and thus their priority values are set to 1. However, since wind direction + and −keys in small areas (5) and (6) are less important than other keys, their priority values are 5. In addition, since a mode key in a small area (7) and a menu key in a small area (8) are not used often, their priority values are set to 2. A value of the tag of interface is "AIR1_interface", such that those objects are identified altogether as a single UI of the remocon of air conditioner 1. In the example shown in FIG. 2(B), it is possible to remotely operate (control) the air conditioner identified as AIR1 by using the UI of the remocon of air conditioner 1.

As set forth above, according to the present embodiment, priority information (priority value) defined based on the relationship between each UI object and other UI objects is stored as the UI object attribute information in the UI object definition information of each UI definition file.

Next, an operation to compound the UIs of a plurality of applications according to the present embodiment is described with reference to the flowcharts shown in FIG. 3 to FIG. 5.

Figure 3:
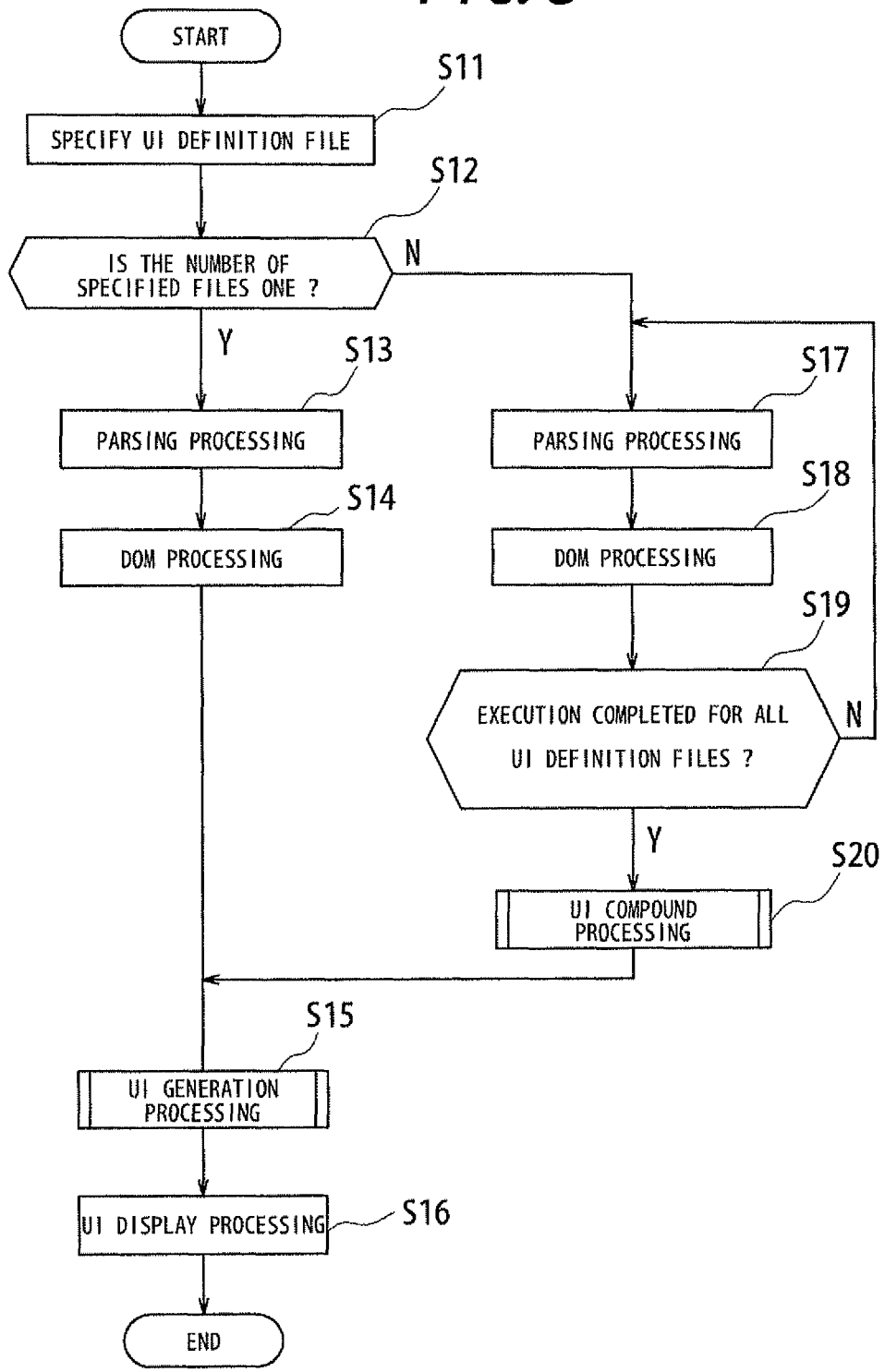
FIG. 3 is a flowchart illustrating an overall processing by the user interface generation unit according to the first embodiment.
Figure 4:
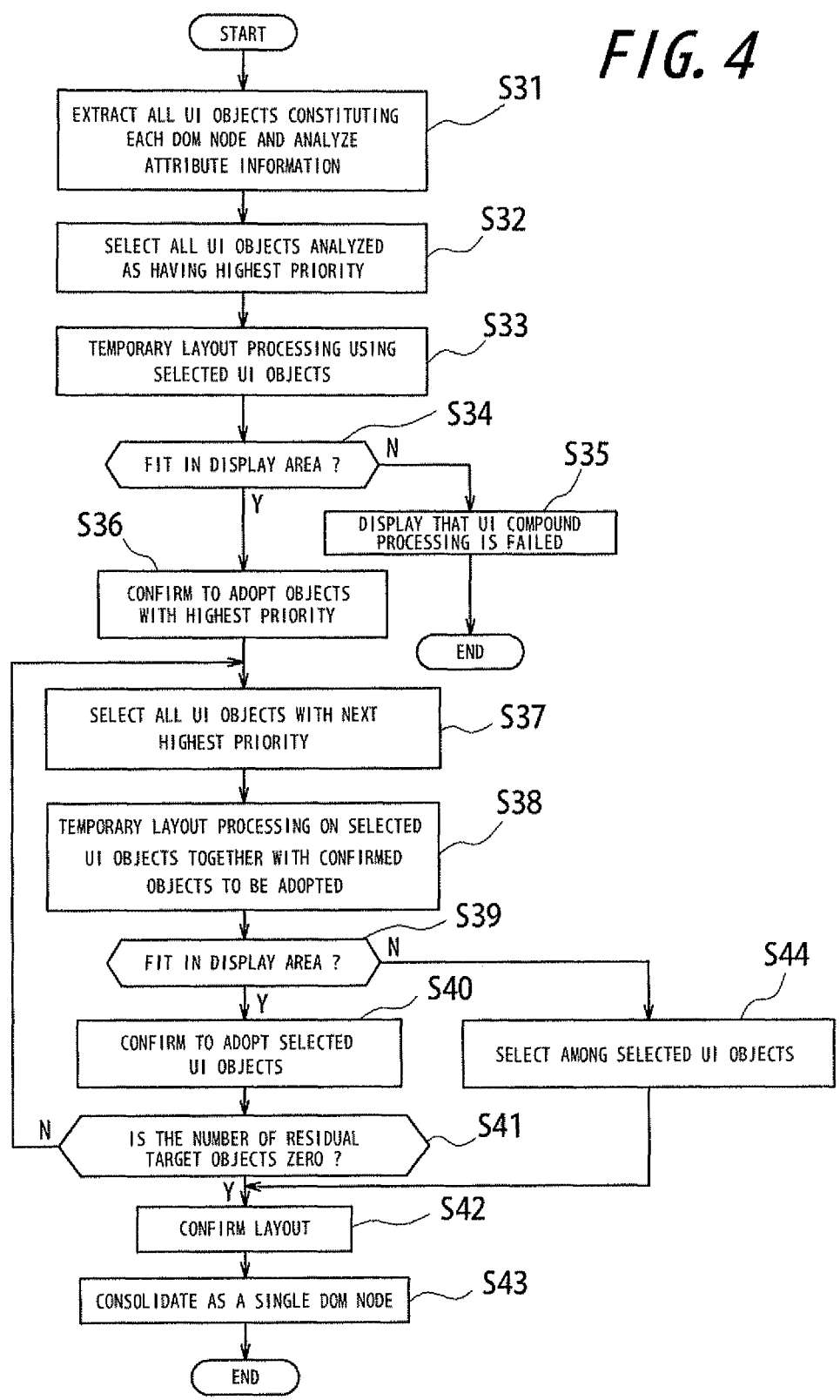
FIG. 4 is a flowchart further illustrating a user interface compound processing shown in FIG. 3.

FIG. 3 is a flowchart illustrating an overall processing of the UI generation unit 16 according to the present embodiment. First, when processing to generate the UI is started based on input to the input unit 22 and the like by the user, the UI definition file (XML file) is specified from the application providing the UI (step S11). As an operation to trigger the UI generation processing may be an operation by the user to initiate the application using the UI or an operation by the user to initiate an application using the UI additionally when another application is already executed by the user.

Next, the UI generation unit 16 determines whether the number of specified UI definition files is one or more (step S12), If it is determined that the number of specified UI definition files is one, the UI generation unit 16 determines that the application does not require to compound the plurality of UIs and performs the XML parsing process (step S13) and the DOM process (step S14) on the specified single UI definition file.

If the number of the specified UI definition file is only one as stated above, a processing thereafter is the same as a conventional UI generation processing. That is, based on the UI definition file on which the parsing process and the DOM process are performed, the UI generation unit 16 performs the UI generation processing (step S15). The UI generation processing at step S15 will be described below. Next, based on the UI of the XML file generated by the UI generation processing, the application execution unit 12 executes processing to display the UI in the UI display area of the display unit 24 of the touch panel 20 (step S16).

Thereby, the mobile phone 1 may display a single UI on the display unit 24 in accordance with execution of a single application. For example, if the UI definition file for the TV remocon is specified by initiation of the TV remocon application, the UI is displayed as shown in FIG. 2(A). Meanwhile, if the UI definition file for the air conditioner remocon is specified by initiation of the air conditioner remocon application, the UI is displayed as shown in FIG. 2(B).

In contrast, if the number of specified files is more than one at step S12, the UI generation unit 16 determines that the application requires to combine the plurality of UIs and performs the XML parsing process (step S17) and the DOM process (step S18) on each of the XML files. At step S19, the UI generation unit 16 determines whether the parsing process and the DOM process for all of the UI definition files are completed. If they are not completed, the UI generation unit 16 returns to step S17.

When the parsing process and the DOM process for all of the UI definition files are completed at step S19, the UI compound processing unit 18 compounds the plurality of UIs for which the parsing process and the DOM process are completed (step S20). The UI compound processing at step S20 will be also described below.

Subsequently, the UI generation unit 16 executes processing to generate a compound UI based on the compound UI definition file compounded at step S20 (step S15). Next, the application execution unit 12 executes processing to display the compound UI generated in the UI display area of the display unit 24 of the touch panel 20 (step S16) and ends an overall processing to generate the UI.

Next, the UI compound processing at step S20 shown in FIG. 3 is further described with reference to the flowchart shown in FIG. 4.

When the UI compound processing starts, the UI compound processing unit 18 extracts all of the UI objects constituting DOM nodes of the plurality of UIs for which the parsing process and the DOM process are completed and analyzes attribute information of each UI object (step S31). According to the present embodiment, priority information (priority) of each UI object is analyzed as the attribute information of each UI object.

Next, the UI compound processing unit 18 extracts all UI objects with the highest priority of the priority information (priority="0"), that is, the UI objects essential to be displayed (step S32) and executes a temporary layout processing with extracted UI objects (step S33). The temporary layout processing arranges the UI objects essential to be displayed as the temporal layout by an arithmetic processing within the UI compound processing unit 18 without actually displaying the UI objects on the display unit 24.

After completing the temporal layout processing, the UI compound processing unit 18 determines whether display of entire UI, in which the UI objects are arranged as the temporary layout, fits in the UI display area for displaying the UI in the display unit 24 (step S34). If it is determined that the display of the UI does not fit in the UI display area as a result of determination, the plurality of UIs cannot be displayed as the compound UI. Therefore, the UI compound processing unit 18 displays that the compound processing of the plurality of UI is failed on the display unit 24 (step S35) and ends the UI compound processing. This is a measure for when it is attempted that too many UI are compounded on the same screen to display even essential objects.

If it is determined at step S34 that the display of entire UI, in which the UI objects are arranged as the temporary layout, fits in the UI display area in the display unit 24, the UI compound processing unit 18 confirms to adopt the UI objects with the highest priority (essential to be displayed) (step S36).

Next, the UI compound processing unit 18 extracts all UI objects with next higher priority, based on the priority information analyzed (step S37). For example, if the UI objects with the priority="0" has been extracted and processed previously, the UI objects with the priority="1" are extracted now. In addition, the UI compound processing unit 18 compounds extracted UI objects and the UI objects with the highest priority confirmed at step S36 and performs the temporary layout processing (step S38). After completing the temporary layout processing, the UI compound processing unit 18 determines whether display of the UI objects of the temporary layout fits in the UI display area of the display unit 24 (step S39).

If it is determined that the display of the UI objects of the temporary layout fits in the UI display area of the display unit 24 as a result of determination at step S39, the UI compound processing unit 18 confirms to adopt these UI objects (step S40).

Subsequently, the UI compound processing unit 18 determines whether the number of residual UI objects whose priority information has not finished to be analyzed is zero (step S42). If the number of residual UI objects whose priority information has not finished to be analyzed is not zero, that is, there still are unanalyzed UI objects, the UI compound processing unit 18 returns to step S37. In this manner, the UI compound processing unit 18 repeats selection and confirmation of the UI objects in order of the priority, so far as the UI display area permits and there are the residual UI objects.

If the number of residual UI objects with unanalyzed priority information is zero, that is, there is no residual unanalyzed UI object, the UI compound processing unit 18 confirms that the temporary layout of the compound UI objects at this point as a proper layout (step S42). Then, the UI compound processing unit 18 consolidates the UI objects of a confirmed layout as a single DOM node (step S43) and ends the UI compound processing.

If the display of the UI objects of the temporary layout does not fit in the UI display area of the display unit 24 at step S39, the UI compound processing unit 18 makes a selection from the UI objects which have been extracted already based on a predetermined condition (step S44) and then shifts to step S42. The predetermined condition to make a selection is appropriately defined in advance in relation to relationships between the UI objects or display sizes of the UI objects, in case there are a plurality of UI objects with the same priority and a display of all of them cannot fit in the UI display area.

Next, the UI generation processing at step S15 shown in FIG. 3 is further described with reference to the flowchart shown in FIG. 5.

Figure 5:
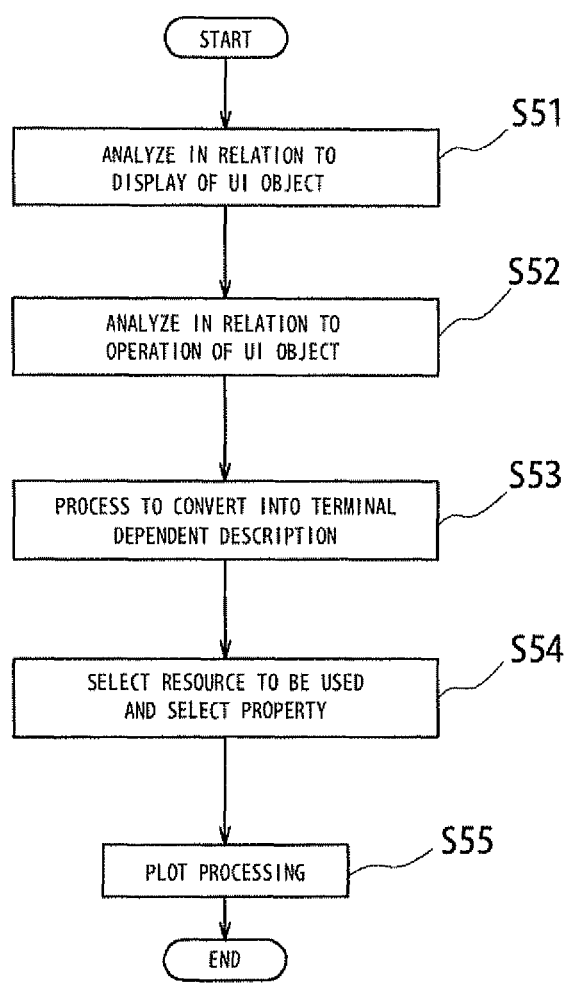
FIG. 5 is a flowchart further illustrating a user interface generation processing shown in FIG. 3.

At start of the UI generation processing shown in FIG. 5, either the UI based on a specified single UI definition file or the compound UI based on a plurality of UI definition files is formed as a single DOM document (or DOM node). First, the UI generation unit 16 performs analysis in relation to display of the DOM document (step S51). For the UI definition file descried in the UIML form, attribute with structure tag or style tag is analyzed. Next, the UI generation unit 16 performs analysis in relation to operation of the DOM document (step S52). For the UI definition file described in the UIML form, attribute with behavior tag is analyzed.

Next, the UI generation unit 16 executes processing to convert description included in the DOM document into description depending on each terminal (step S53). In addition, the UI generation unit 16, based on a result of conversion at step S53, selects a resource of the UI objects to be used and sets each attribute (property) (step S54). For this selection, necessary resource of the UI objects is stored as the individual UI resource in the individual UI resource memory area 56 or as the common UI resource in the common UI resource memory area 58. Then, the UI generation unit 16 executes a plot processing of the UI including UI objects (step S55). Thereby, the UI generation processing is finished. After this, it shifts to step S16 shown in FIG. 3 to execute the UI display processing.

Figure 6:
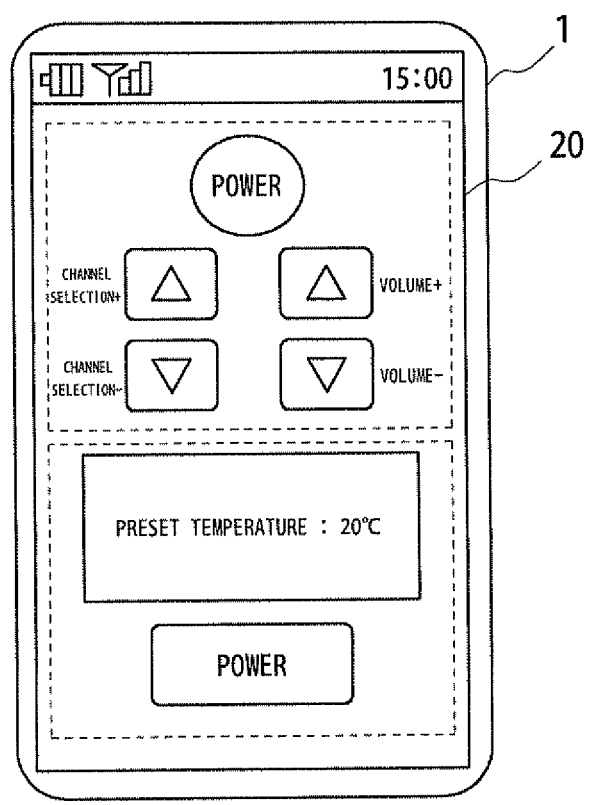
FIG. 6 is a diagram illustrating an example in which two user interfaces are compounded according to the first embodiment.

Thus, if the TV remocon UI shown in FIG. 2(A) and the air conditioner remocon UI shown in FIG. 2(B) are compounded, for example, a compound UI as shown in FIG. 6 is generated. The compound UI shown in FIG. 6 divides the touch panel 20 into two areas: an upper area in which the UI objects of the TV remocon UI are arranged; and a lower area in which the UI objects of the air conditioner remocon UI are arranged. Here, the UI objects with the priority "0" and "1" are extracted for the TV remocon UI, while the UI objects only with the priority "0" is extracted for the air conditioner remocon UI, so as to compound the UIs. In this manner, two XML files are analyzed and the UI objects with the higher priority are automatically arranged so as to compound a plurality of UIs according to the present embodiment. It is thus possible for the user to use a plurality of UIs at the same time without switching among a plurality of applications or the UIs based on the applications.

(Second Embodiment)

Next, a UI compound processing by the UI generation apparatus according to a second embodiment of the present invention is described. According to the present embodiment, the UI object attribute information is changed, which is information on each UI object used for compounding a plurality of UIs and included in the UI object definition information.

In the above first embodiment, based on the relationship between each UI object and other UI objects, the priority to display each object at compound of the plurality of UIs is defined in advance as the UI object attribute information. According to the present embodiment, identification information of UI having the UI object as a component is defined as well as the UI object attribute information according to the first embodiment.

Figure 7:
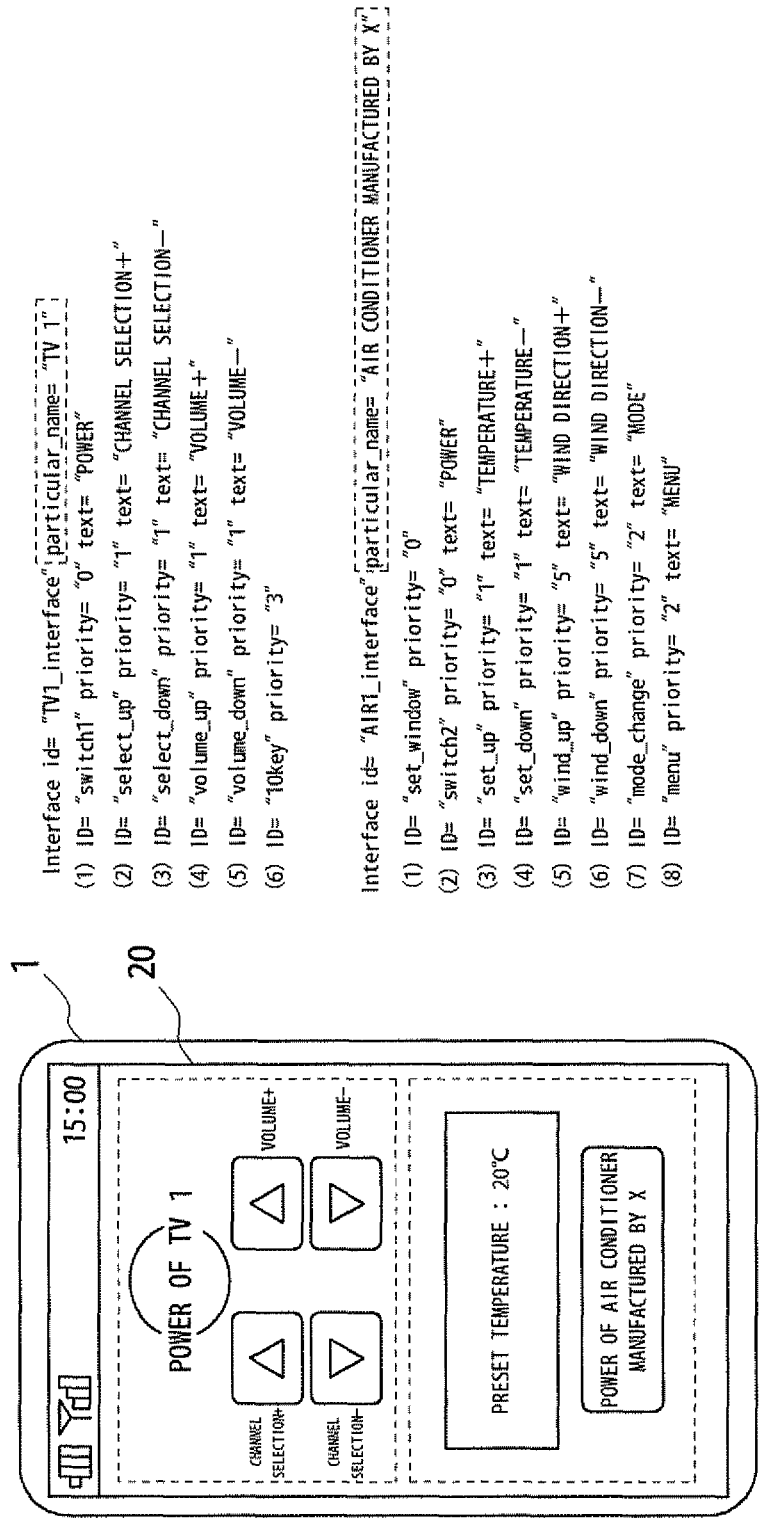
FIG. 7 is a diagram illustrating compound of the user interfaces using user interface identification information, which is the user interface object attribute information, according to a second embodiment.

FIG. 7 is a diagram illustrating UI compound using the UI identification information according to the present embodiment. In the present embodiment, in addition to the UI object definition information described above with respect to FIG. 2, text information (text) to be attached to each UI object is added as the UI object attribute information, as shown on the right in FIG. 7. In addition, text information (particular_name) indicating the UI is added to the UI identification information (Interface id).

In the UI definition information described in the XML form, the text information (particular name) indicating the UI is information describing a name displayed on the UI object as necessary so as to enable to identify the UI, to which the UI object belongs to, by using a link to a text, an icon and the like. For example, as shown on the right in FIG. 7, particular_name ="TV1", which is text information indicating the UI in a dashed box and indicates the UI, is added to the UI identification information (Interface id) so as to indicate that a set of UI objects (1) to (6) are components of the UI of the "TV1". Similarly, particular_name="air conditioner manufactured by X", which is text information indicating the UI in another dashed box, is added to the UI identification information so as to indicate that a set of UI objects (1) to (8) are components of the UI of the "air conditioner manufactured by X". Each text information (text) is information on the name and the like described by a text, which can be placed on or near the UI object as necessary when the UI object is displayed in the display unit 24.

The text information indicating the UI facilitates to distinguish which UI the keys and the buttons displayed on the compound UI belong to, when a plurality of UIs are compounded.

Figure 8:
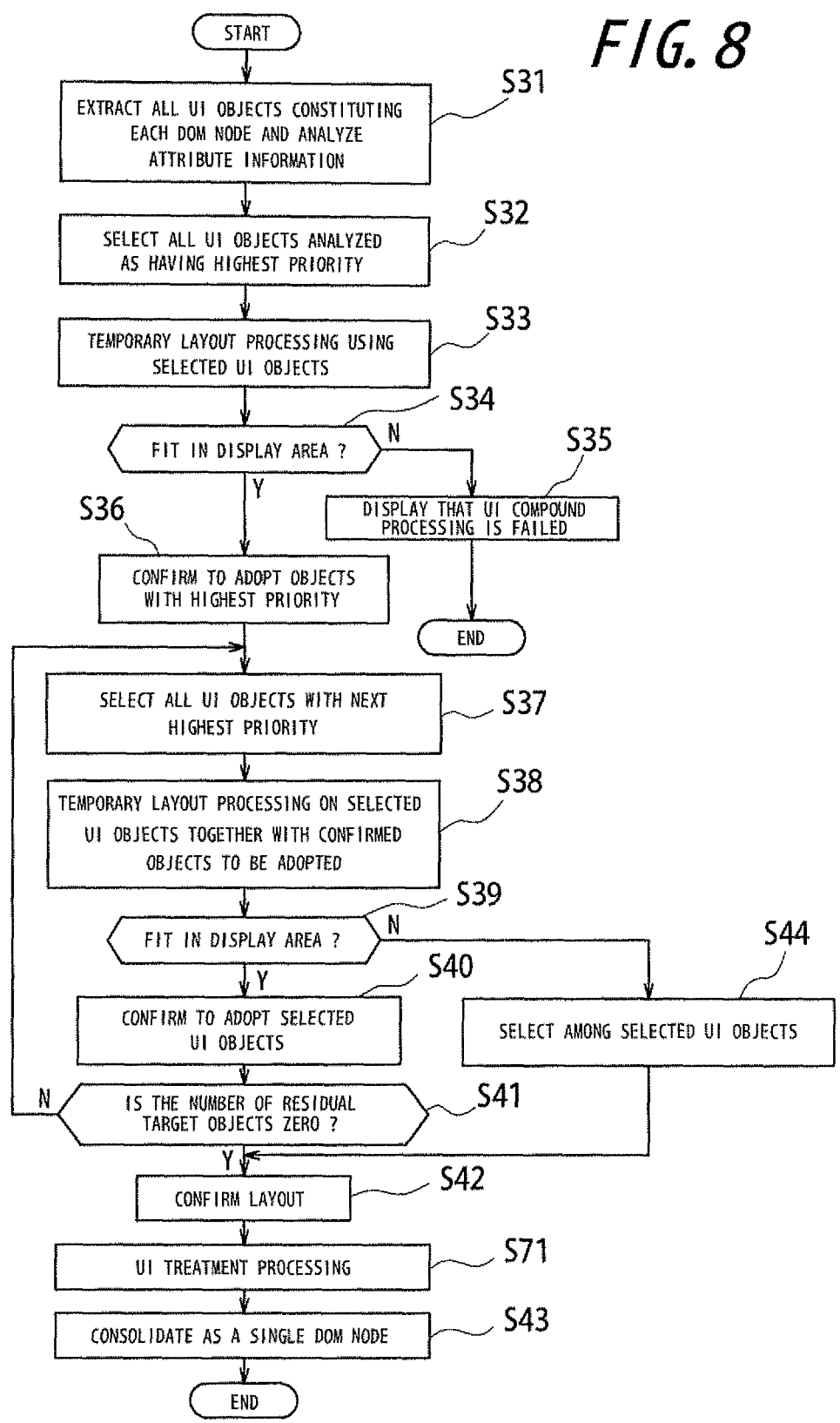
FIG. 8 is a flowchart illustrating a user interface compound processing according to the second embodiment.

Next, the UI compound processing at step S20 shown in FIG. 3 according to the present embodiment is described with reference to a flowchart shown in FIG. 8. In the UI compound processing shown in FIG. 8 according to the present embodiment, a UI processing treatment (step S71) by the text information indicating the UI and the like is added after confirmation of the layout of the UI object at step S42 shown in FIG. 4 according to the first embodiment.

In the UI treatment processing by the text information indicating the UI and the like at step S71, in order to compound a plurality of UIs, for example, it is determined whether there are UI objects having the same text information (text) among the plurality of UI, when the attribute information of each UI object is analyzed. If there are UI objects having the same text information among different UIs and a compound UI is generated in such a state, it makes difficult for the user to distinguish to which UI each of the UI objects having the same text information belongs to. Thus, if there are the UI objects having the same text information among different UIs, the UI compound processing unit 18 puts each text of the UI identification information on or near the UI object.

For example, a compound UI of the TV remocon UI and the air conditioner remocon UI is generated in the example shown in FIG. 7, and analysis on the text information of each UI object of the two UIs shows that both UI have the same text information of "Power". There is no other same text commonly included in the UIs. Therefore, when the UI object "Power" is displayed, the text information (particular_name) added to the UI identification information of the UI to which the UI object belongs to is placed nearby.

Thereby, the compound UI is generated as shown on the left in FIG. 7. Since only "Power" is displayed for the UI object "Power" in the compound UI described above with respect to FIG. 6, it is difficult for the user to distinguish at a glance which UI the power belongs to. However, the compound UI shown in FIG. 7 enables the user to distinguish at a glance to which UI the UI object of each power belongs to.

There may be numerous variations of the present embodiment, other than placing the text added to the UI identification information on or near the UI objects having the same text. For example, as shown in FIG. 9(A), it is possible to divide the UI display area by using a parting image or a different color for each UI based on the UI identification information of each UI and displays each text added to the UI identification information at a unobstractive position in each of the display areas.

In addition, it is also possible to place each text added to the UI identification information on or near all of the UI objects as shown in FIG. 9(B), regardless of whether the UI objects have the same text information.

Moreover, as a variation of FIG. 9(A), it is also possible to display icons indicating the UIs, instead of the text of the UI identification information, in each of the UI display areas as shown in FIG. 9(C). Since the UI identification information is generally placed to a description of text in a document described in the XML form, it is suitable to display as shown in FIG. 9(C) if it is difficult to place the text to each UI object such as when a character string to be displayed is defined by a resource of an image.

(Third Embodiment)

Next, UI compound processing by the UI generation apparatus according to a third embodiment of the present invention is described. According to the present embodiment, in the same manner as the above second embodiment, the UI object attribute information, which is information on each UI object used for compounding a plurality of UIs and included in the UI object definition information, is changed.

According to the present embodiment, instead of the UI object attribute information defined in the second embodiment or together with the UI object attribute information in the second embodiment, information to enable or disable each UI object constituting the compound UI is included in the UI object definition information.

FIG. 10 is a diagram illustrating UI compound using the information to enable or disable each UI object, which is the UI object attribute information according to the present embodiment. According to the present embodiment, as shown on the right in FIG. 10, information (com_effect) on whether each UI object constituting the compound UI is enabled/disabled is further added as the UI object attribute information to the UI object definition information described above with respect to FIG. 7.

If the UI object enable/disable information (com effect) has "YES" value, the UI object is handled as "enabled", whereas, if the value is "NO", the UI object is handled as "disabled". The UI object enabled according to the information is displayed in the UI display area of the display unit 24 at compound of the UIs and receives input to the input unit 22 at positions corresponding to the display. In contrast, the UI object disabled according to the information is neither displayed in the UI display area of the display unit 24 at compound of the UIs nor receives input to the input unit 22.

In the example shown in FIG. 10(A), for example, only the UI object (I) of "Power ON", among the UI objects (1) to (7) constituting the remocon UI of the TV1, has the enable/disable information (com_effect) of the UI object indicating enable ("YES"). Therefore, among the UI objects constituting the TV remocon UI, only a key of Power ON is displayed in the UI display area. In addition, only the UI object (2) of "Power ON", among the UI objects (1) to (9) constituting the air conditioner remocon UI, has the enable/disable information (com_effect) of the UI object indicating enable ("YES"). Therefore, among the UI objects constituting the air conditioner remocon UI, only a key of Power ON is displayed in the UI display area.

In addition, according to the present embodiment, information to change (update) the enable/disable information of each UI object is included, as an operation to be executed by the application execution unit 12 when an event occurs to each UI object, in the action information included in the UI object definition information described in the first embodiment. Based on the action information, the application execution unit 12 can update the enable/disable information (com_effect) of a predetermined UI object from enable to disable (from "YES" to "NO") or vice versa, in response to occurrence of the event to the predetermined UI object.

Next, the UI compound processing at step S20 shown in FIG. 3 according to the present embodiment is described with reference to a flowchart shown in FIG. 11. In the UI compound processing shown in FIG. 11 according to the present embodiment, a process (step S91) to extract only UI objects determined as enabled as a result of analysis is added after the UI objects are extracted and the attribute information thereof is analyzed at step S31 according to the second embodiment shown in FIG. 8.

Figure 11:
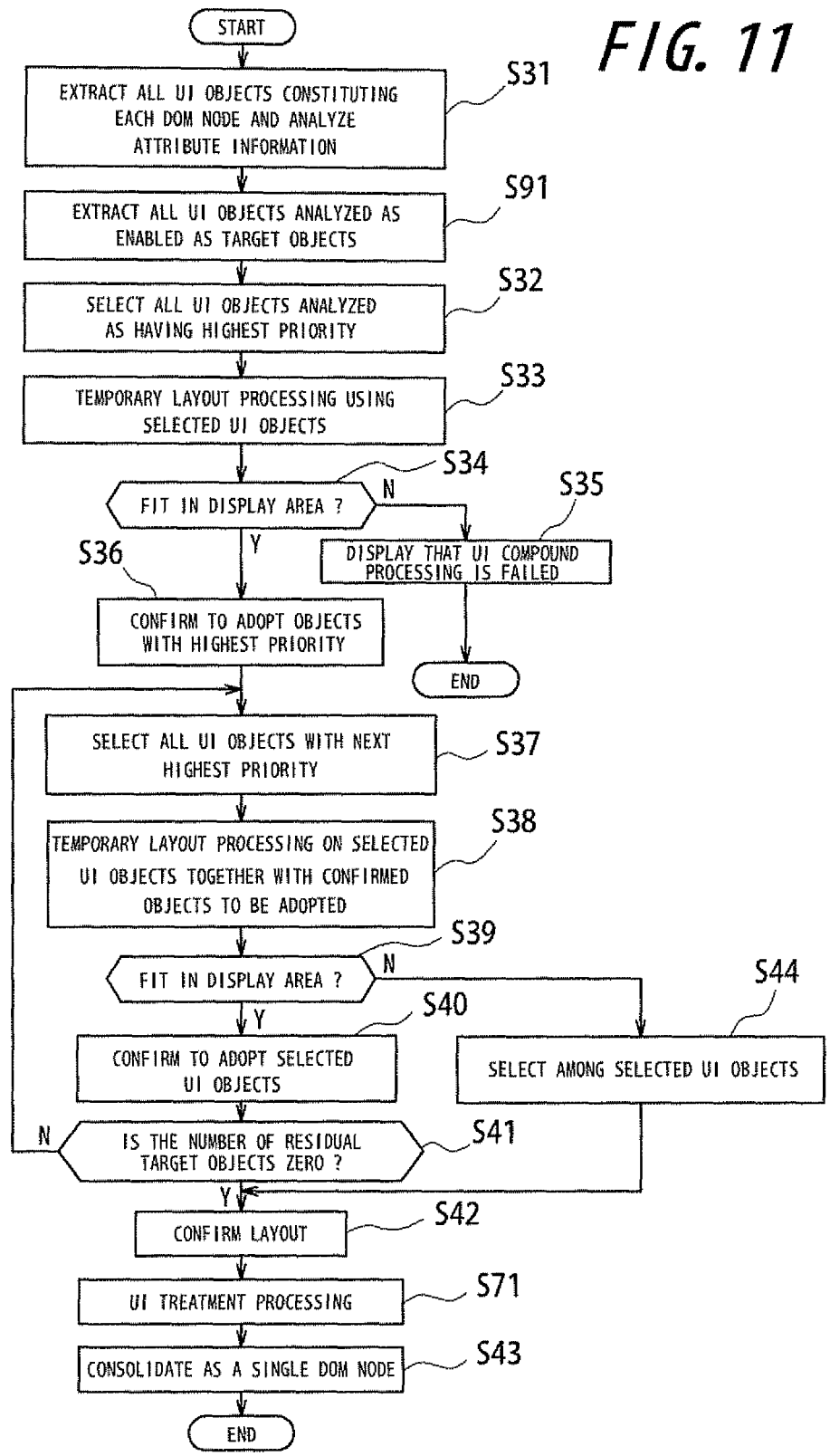
FIG. 11 is a flowchart illustrating a user interface compound processing according to the third embodiment.

When the UI compound processing shown in FIG. 11 is started, the UI compound processing unit 18 extracts all of the UI objects constituting each DOM node with respect to DOM nodes of the plurality of UIs for which the parsing process and the DOM process are completed and analyzes the attribute information of each UI object (step S31). According to the present embodiment, the priority information (priority) of each of the UI objects used in the first and the second embodiments are analyzed as the attribute information of each UI object. In addition, the UI compound processing unit 18 analyzes the enable/disable information (com_effect) of each UI object and extracts all UI objects determined as enabled (the value is "YES") as target UI objects (step S91).

Thereafter, with respect to the enabled UI objects extracted as target UI objects, the compound UI is generated by performing processing after step S32 described in the first and the second embodiments.

According to the present embodiment, if an event of input to the input unit 22 corresponding to a predetermined UI object is occurred after the compound UI generated is displayed in the UI display area of the display unit 24, the compound UI is updated in accordance with the event. That is, when the event is occurred, the application execution unit 12, based on the action information included in the UI object definition information, updates the enable/disable information of the predetermined UI object and performs again the UI compound processing shown in FIG. 11, so as to update the compound UI.

For example, if the event of input is occurred to the UI object "Power ON" of the air conditioner remocon UI in a state shown in FIG. 10(A), the application execution unit 12 first instructs to transmit the infrared signal to turn on the power of the air conditioner, which is the external equipment. Then, the application execution unit 12, based on the action information, changes the value of com_effect, which is the attribute of the UI object "Power ON" of the air conditioner remocon UI shown in FIG. 10(A), from "YES" to "NO" as well as changing the value of com effect of predetermined other UI objects.

FIG. 10(B) is a diagram illustrating a state after the value of com_effect, which is the attribute of the UI object, is changed based on the action information after occurrence of the event. Compared with FIG. 10(A), the values surrounded by dashed boxes among the values of the attribute corn effect of the air conditioner remocon UI are changed from enable to disable or from disable to enable as shown on the right in FIG. 10(B). When the enable/disable information of the predetermined UI objects are changed as stated above and the UI compound processing is executed again, the compound UI is updated to include enabled UI objects, as shown on the left in FIG. 10(B).

By such processing, it is possible for each UI to hide the UI objects unnecessary before turning the power on as shown in FIG. 10(A), for example, which enables to utilize the UI display area effectively. In addition, if there is input to the object of Power ON of the air conditioner remocon UI shown in FIG. 10(A), for example, necessary UI objects are developed after power is turned on, as shown in FIG. 10(B). Accordingly, since the UI to be displayed in the UI display area actively changes based on input by the user, it is possible to display only necessary UI objects when necessary.

Moreover, when the compound UI is updated in response to occurrence of each event, the enabled UI object is analyzed based on attribution of the priority described in the first embodiment. Therefore, UI objects to be displayed are actively changed in series in accordance with their priority.

Figure 12:
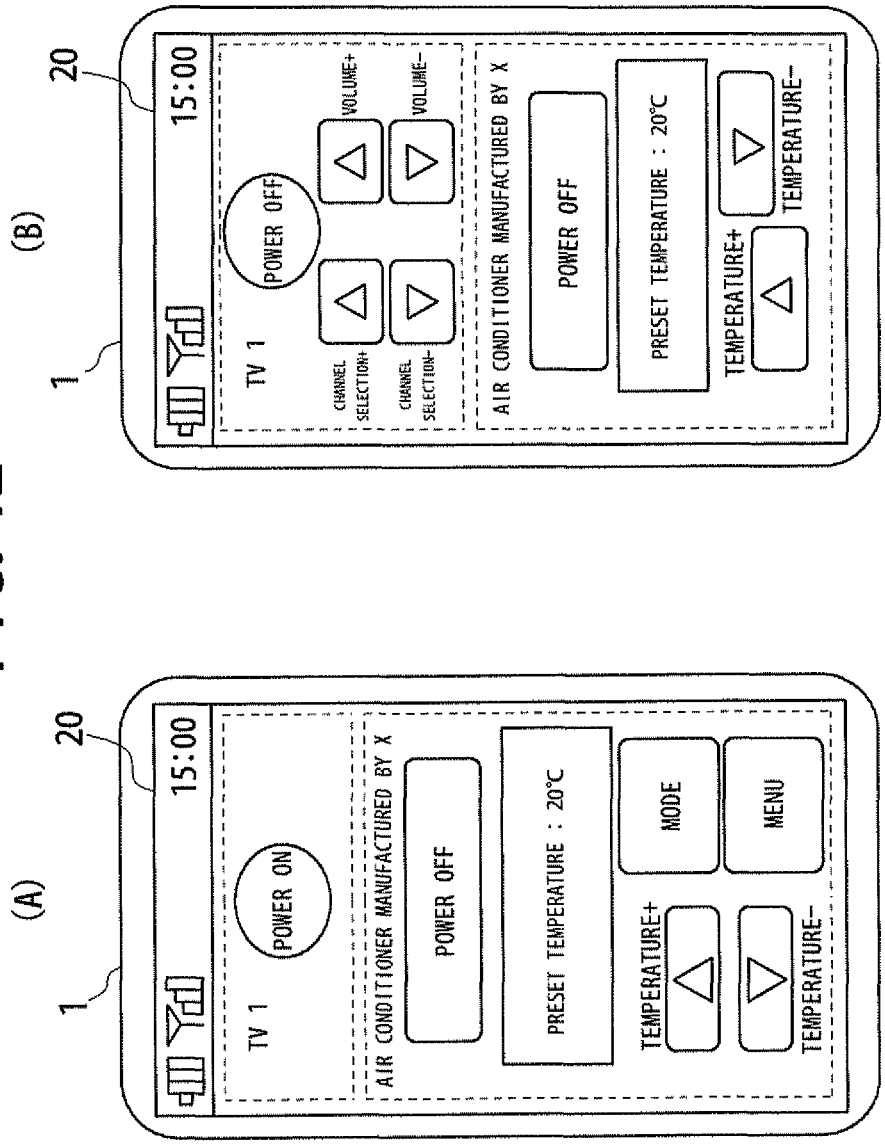
FIG. 12 shows diagrams illustrating examples of updated user interfaces according to the third embodiment.

The following is an exemplary case in which there is input to the UI object "Power ON" of the TV remocon UI in a state shown in FIG. 12(A). In response to occurrence of the event to input to "Power ON", the application execution unit 12 updates the enable/disable information of predetermined UI objects constituting the TV remocon UI, thereby the UI objects with high priority are displayed in the UI display area. However, there is no space in the UI display area to display more UI objects in the state shown in FIG. 12(A). Therefore, when updating the compound UI, the UI compound processing unit 18 generates a compound UI without adopting the UI objects with low priority based on the attribute information of the priority of each UI object.

By updating (compounding) the UI as stated above, necessary UI objects of the TV remocon UI are displayed as shown in FIG. 12(B) when the power of the TV is turned on by operation on the TV remocon UI. On the other hand, less necessary UI objects are not displayed when the air conditioner remocon UI is updated, so as to provide the compound UI more effectively utilizing the UI display area.

Among the UI objects, there are UI objects such as UI objects to control volume, for example, which are inconvenient if there is only one of "Volume+(up)" and "Volume−(down)" and make senses only when both of such UI objects are together. Accordingly, in the present embodiment, when a configuration of the UI display area is changed in series by updating the compound UI as stated above, two UI objects which should be coupled are determined to be adopted or not as a pair.

In particular, as shown in FIG. 13, attribute (relate ID) indicating that a plurality of UI objects are coupled is added as the UI object attribute information to the UI object definition information, and the pair of UI objects is defined based on a value of the attribute. In an example shown in FIG. 13, for the TV remocon UI, it is indicated by attribute (relate_ID) that the UI objects "Select Channel+" in (2) and "Select Channel−" in (3) are coupled, and values of their attribute are defined as "select_1". In addition, it is also indicated by the attribute (relate_ID) that the UI objects "Volume+" in (4) and "Volume−" in (5) are coupled, and values of their attribute are defined as "volume_1". The attribute (com_effect) whether each UI object is enabled/disabled is omitted in the attribute information shown in FIG. 13.

Similarly, for the air conditioner remocon UI, it is indicated by attribute (relate_ID) that the UI objects "Temperature+" in (3) and "Temperature−" in (4) are coupled, and values of their attribute are defined as "set_1". In addition, it is also indicated by the attribute (relate_ID) that the UI objects "Wind Direction+" in (5) and "Wind Direction−" in (6) are coupled, and values of their attribute are defined as "wind_1".

In order to update the compound UI by setting the UI object attribute information, the attribute (relate_ID) which couples the UI objects is also analyzed at analysis based on the priority and enable/disable attribute (com_effect). The UI objects with the attribute (relate_ID) which couples the UI objects are determined to be adopted or not as a couple based on a value of the attribute.

Thereby, even if there are numerous UI objects with the same priority, for example, two UI objects which should be coupled are always displayed or hidden as a pair. In an example shown in FIG. 13, for the air conditioner remocon UI, the UI objects "Temperature+" and "Temperature−" with high priority (priority="1") are adopted as a pair, while the UI objects "Wind Direction+" and "Wind Direction−" with low priority (priority="5") are rejected as a pair. Accordingly, there is no inconvenience occurred at update of the compound UI that only the UI object of "Volume +" is displayed, whereas the UI object of "Volume−" is not displayed.

It is to be understood that the present invention is not limited to the embodiments set forth above but may be varied or altered in a multiple of manners. For example, although it is determined whether to adopt two UI objects, which should be coupled, as a pair by using the UI object attribute information (relate_ID) in the third embodiment, the number of UI objects to be grouped is not only two but may be three or above.

In addition, although the mobile phone 1 remotely controls the external equipments with infrared communication by the infrared communication unit 40 in each of the embodiment set forth above, it is also possible to employ Near Field Communication such as Bluetooth (registered trademark), wireless LAN or the like, for example, for communication with the external equipments.

Although the UI object attribute information is included in the UI object definition information in each of the above embodiments, the UI object attribute information may not be included in the UI object definition information. For example, the UI object attribute information may be stored in association with corresponding UI object definition information in an area different from an area of the memory unit 50 in which the UI object definition information is stored.

In addition, the UI object attribute information may not be defined in a state where contents thereof are fixed. That is, for example, the control unit 10 may change the contents of the UI object attribute information based on a usage history of the UI and the like.

Moreover, the UI object attribute information may not be defined in advance. That is, the control unit 10 may analyze the UI definition file stored in the memory unit 50 and generate the UI object attribute information based on contents of the UI object definition information included in the UI definition file, an association between the UI object definition information, the usage history of the UI and the likes.

Furthermore, although the operation by the user to initiate an application using the UI or the operation by the user to initiate an application which uses the UI when another application is already being executed are taken as trigger to start the UI generation process in each of the above embodiments, operations to trigger the UI generation process are not limited thereto.

In each of the above embodiments, for example, the mobile phone 1 as the UI generation apparatus may obtain information on the external equipments near the UI generation apparatus by Near Field Communication such as wireless LAN, Bluetooth and the like or an RF tag reader and generate the UI based on the information obtained. That is, the mobile phone 1 may automatically generate the UI (UI for a remocon application to operate the external equipment) in relation to external equipment near the mobile phone 1 by detecting the external equipment, without operations by the user.

In addition, the mobile phone 1 as the UI generation apparatus may select the UI to generate, based on location information obtained by GPS and the like and time information. That is, the mobile phone 1 may automatically generate UI currently necessary at a current place, based on change in a current location, a schedule made in advance and the like.

Moreover, although the UI definition file of the UI corresponding to each application is stored in the UI definition file memory area 54 in advance in each of the above embodiments, it is also possible to obtain a necessary UI definition file externally as necessary. That is, if the necessary UI definition file is not stored in the memory unit 50 when the UI is generated, it is possible to obtain the necessary UI definition file by downloading via the communication unit of the mobile phone 1.

In this case, if the UI definition file is specified from the application providing the UI at step S11 shown in FIG. 3, it is determined whether the necessary UI definition file is stored in the UI definition file memory area 54. If the necessary UI definition file is not stored in the UI definition file memory area 54, the UI obtaining unit 14 of the control unit 10 obtains the necessary UI definition file from external equipment or an external server (not shown) via the wireless communication unit 30.

In each of the above embodiments, the mobile terminal having the touch panel executes the UI compound processing. However, the touch panel is not an essential element for the UI compound processing according to the present invention. The present invention may be applicable to a terminal having any input unit assuming to be used by compounding the UI, such as a terminal having an input unit with numerous mechanical keys or any pointing device, for example.

Shown below is an exemplary file in the UIML form based on XML as an example of the UI definition file used in each of the above embodiments. Underlined parts are additional UI object attribute information according to the present invention. In this example, in addition, the UI object is defined by <template> tag, and thus a description between <template> and </template> corresponds to the UI object definition information.

First, an exemplary TV1_interface.uiml file is shown as the UI definition file composing the TV remocon UI.

```
<?xml version="1.0" encoding="Shift_JIS"?>
<uiml>
    <interface id = "TV1_interface" particular name = "TV1">
        <structure>
            <part class="G:TopContainer" id="top">
                <part class="G:Image" id="bg"/>
                <part class="VBOX" id="vbox1">
                    <part class="G:Area" id="a1" source="#t1_switch1" how="replace"/>
                    <part class="G:Area" id="a6" source="#t1_10key" how="replace"/>
                    <part class="HBOX" id="hbox1">
                        <part class="G:Area" id="a2" source="#t1_select_up" how="replace"/>
                        <part class="G:Area" id="a3" source="#t1_select_down" how="replace"/>
                    </part>
                    <part class="HBOX" id="hbox2">
                        <part class="G:Area" id="a4" source="#t1_volume_up" how="replace"/>
                        <part class="G:Area" id="a5" source="#t1_volume_down" how="replace"/>
                    </part>
                </part>
            </part>
        </structure>
        <style>
            <property part-name="bg" name="image-src">TV_resource_bg.jpg</property>
            <property part-name="header" name="g:location">0,0</property>
            <property part-name="header" name="g:size">240,400</property>
        </style>
        <behavior>
        </behavior>
    </interface>
    <template id = "t1_switch1" priority = "0">
        <part>
            <part class="G:Button" id="switch1">
            <style>
                <property name="image-src">TV_resource_switch1.jpg</property>
                <property name="g:text">Power</property>
                <property name="g:size">30,30</property>
            </style>
            <behavior>
                <rule>
                    <condition>
                        <op name="and">
                            <event class="KeyListener.g:keypressed"/>
                            <op name="equal">
                                <property event-class="KeyListener.g:keypressed" name="keyCode" />
                                <constant value="57398" />
                            </op>
                        </op>
                    </condition>
                    <action>
                        <call name="TVApp.on"/>
                    </action>
                </rule>
            </behavior>
```

```
            </part>
        </part>
</template>
<template id = "t1_select_up" priority = "1" relate_id="select_1">
    <part>
        <part class="G:Button" id="select_up">
        <style>
            <property name="image-src">TV_resource_select_up.jpg</property>
            <property name="g:text">Channel Selection +</property>
            <property name="g:size">30,20</property>
        </style>
        <behavior>
            <rule>
                <condition>
                    <op name="and">
                        <event class="KeyListener.g:keypressed"/>
                        <op name="equal">
                            <property event-class="KeyListener.g:keypressed" name="keyCode" />
                            <constant value="57399" />
                        </op>
                    </op>
                </condition>
                <action>
                    <call name="TVApp.select_up"/>
                </action>
            </rule>
        </behavior>
        </part>
    </part>
</template>
<template id = "t1_select_down" priority = "1" relate_id="select_1">
    <part>
        <part class="G:Button" id="select_down">
        <style>
            <property name="image-src">TV_resource_select_down.jpg</property>
            <property name="g:size">30,20</property>
            <property name="g:text">Channel Selection -</property>
        </style>
        <behavior>
            <rule>
                <condition>
                    <op name="and">
                        <event class="KeyListener.g:keypressed"/>
                        <op name="equal">
                            <property event-class="KeyListener.g:keypressed" name="keyCode" />
                            <constant value="57340" />
                        </op>
                    </op>
                </condition>
                <action>
                    <call name="TVApp.select_down"/>
                </action>
            </rule>
        </behavior>
        </part>
    </part>
</template>
<template id = "t1_volume_up" priority = "1" relate_id="volume_1">
    <part>
        <part class="G:Button" id="volume_up">
        <style>
            <property name="image-src">TV_resource_volume_up.jpg</property>
            <property name="g:size">20,30</property>
            <property name="g:text">Volume +</property>
        </style>
        <behavior>
            <rule>
                <condition>
                    <op name="and">
                        <event class="KeyListener.g:keypressed"/>
                        <op name="equal">
                            <property event-class="KeyListener.g:keypressed" name="keyCode" />
                            <constant value="57341" />
                        </op>
                    </op>
                </condition>
                <action>
                    <call name="TVApp.volume_up"/>
                </action>
            </rule>
```

```
            </behavior>
        </part>
    </part>
</template>
<template id = "t1_volume_down" priority = "1" relate_id="volume_1">
    <part>
        <part class="G:Button" id="volume_down">
        <style>
            <property name="image-src">TV_resource_volume_down.jpg</property>
            <property name="g:size">20,30</property>
            <property name="g:text">Volume -</property>
        </style>
        <behavior>
            <rule>
              <condition>
                  <op name="and">
                      <event class="KeyListener.g:keypressed"/>
                      <op name="equal">
                          <property event-class="KeyListener.g:keypressed" name="keyCode" />
                          <constant value="57342" />
                      </op>
                  </op>
              </condition>
              <action>
                  <call name="TVApp.volume_down"/>
              </action>
            </rule>
        </behavior>
        </part>
    </part>
</template>
<template id = "t1_10key" priority = "3">
    <part>
        <part class="G:Image" id="10key">
        <style>
                <property name="image-src">TV_resource_10key.jpg</property>
        </style>
        <behavior>
            <rule>
              <condition>
                  <event class="KeyListener.g:keypressed"/>
              </condition>
              <action>
                  <call name="TVApp.receiveKey">
                      <param>
                      <property event-class="KeyListener.g:keypressed" name="keyCode"/>
                      </param>
                  </call>
              </action>
            </rule>
        </behavior>
        </part>
    </part>
</template>
<peers>
    <presentation base="XXX.uiml" />
    <logic id ="log1" source = "#t1_logic">
    </logic>
</peers>
</uiml>
```

Next, the following is an exemplary AIR1_interface.uiml file as the UI definition file composing the air conditioner remocon UI.

```
<?xml version="1.0" encoding="Shift_JIS"?>
<uiml>
    <interface id = "AIR1_interface" particular name = "Air Conditioner manufactured by X">
        <structure>
            <part class="G:TopContainer" id="top">
                <part class="G:Area" id="a1" source="#t1_switch2" how="replace"/>
                <part class="G:Area" id="a2" source="#t1_wind_up" how="replace"/>
                <part class="G:Area" id="a3" source="#t1_wind_down" how="replace"/>
                <part class="G:Area" id="a4" source="#t1_set_up" how="replace"/>
                <part class="G:Area" id="a5" source="#t1_set_down" how="replace"/>
```

```
                <part class="G:Area" id="a6" source="#t1_set_window" how="replace"/>
                <part class="G:Area" id="a7" source="#t1_mode_change" how="replace"/>
                <part class="G:Area" id="a8" source="#t1_menu" how="replace"/>
                <part class="G:Image" id="bg"/>
            </part>
        </structure>
        <style>
            <property part-name="bg" name="image-src">AIR1_resource_bg.jpg</property>
            <property part-name="header" name="g:location">0,0</property>
            <property part-name="header" name="g:size">240,400</property>
        </style>
    </interface>
    <template id = "t1_switch2" priority = "0">
        <part>
            <part class="G:Button" id="switch2">
                <style>
                    <property name="image-src">AIR1_resource_switch2.jpg</property>
                    <property name="g:size">30,30</property>
                    <property name="g:text">Power</property>
                </style>
                <behavior>
                    <rule>
                        <condition>
                            <op name="and">
                                <event class="KeyListener.g:keypressed" part-name="switch2"/>
                                <op name="equal">
                                    <property event-class="KeyListener.g:keypressed" name="keyCode" />
                                    <constant value="57398" />
                                </op>
                            </op>
                        </condition>
                        <action>
                            <call name="AIR1App.on"/>
                        </action>
                    </rule>
                </behavior>
            </part>
        </part>
    </template>
    <template id = "t1_wind_up" priority = "5" relate_id="wind_1">
        <part>
            <part class="G:Button" id="wind_up">
                <style>
                    <property name="image-src">AIR1_resource_wind_up.jpg</property>
                    <property name="g:size">30,20</property>
                    <property name="g:text">Wind Direction +</property>
                </style>
                <behavior>
                    <rule>
                        <condition>
                            <op name="and">
                                <event class="KeyListener.g:keypressed" part-name="wind_up"/>
                                <op name="equal">
                                    <property event-class="KeyListener.g:keypressed" name="keyCode" />
                                    <constant value="57399" />
                                </op>
                            </op>
                        </condition>
                        <action>
                            <call name="AIR1App.wind_up"/>
                        </action>
                    </rule>
                </behavior>
            </part>
        </part>
    </template>
    <template id = "t1_wind_down" priority = "5"<relate_id="wind_1">
        <part>
            <part class="G:Button" id="wind_down">
                <style>
                    <property name="image-src">AIR1_resource_wind_down.jpg</property>
                    <property name="g:size">30,20</property>
                    <property name="g:text">Wind Direction -</property>
                </style>
                <behavior>
                    <rule>
                        <condition>
                            <op name="and">
                                <event class="KeyListener.g:keypressed" part-name="wind_down"/>
                                <op name="equal">
```

-continued

```
                <property event-class="KeyListener.g:keypressed" name="keyCode" />
                <constant value="57340" />
              </op>
            </op>
          </condition>
          <action>
            <call name="AIR1App.wind_down"/>
          </action>
        </rule>
      </behavior>
    </part>
  </part>
</template>
<template id = "t1_set_up" priority = "1" relate_id="set_1">
  <part>
    <part class="G:Button" id="set_up">
    <style>
      <property name="image-src">AIR1_resource_set_up.jpg</property>
      <property name="g:size">20,30</property>
      <property name="g:text">Temperature+</property>
    </style>
    <behavior>
      <rule>
        <condition>
          <op name="and">
            <event class="KeyListener.g:keypressed" part-name="set_up"/>
            <op name="equal">
              <property event-class="KeyListener.g:keypressed" name="keyCode" />
              <constant value="57341" />
            </op>
          </op>
        </condition>
        <action>
          <call name="AIR1App.set_up"/>
        </action>
      </rule>
    </behavior>
    </part>
  </part>
</template>
<template id = "t1_set_down" priority = "1"<relate_id="set_1">
  <part>
    <part class="G:Button" id="set_down">
    <style>
      <property name="image-src">AIR1_resource_set_down.jpg</property>
      <property name="g:size">20,30</property>
      <property name="g:text">Temperature –</property>
    </style>
    <behavior>
      <rule>
        <condition>
          <op name="and">
            <event class="KeyListener.g:keypressed" part-name="set_down"/>
            <op name="equal">
              <property event-class="KeyListener.g:keypressed" name="keyCode" />
              <constant value="57342" />
            </op>
          </op>
        </condition>
        <action>
          <call name="AIR1App.set_down"/>
        </action>
      </rule>
    </behavior>
    </part>
  </part>
</template>
<template id = "t1_set_window" priority = "0">
  <part>
    <part class="G:Button" id="set_window">
    <style>
      <property name="image-src">AIR1_resource_set_window.jpg</property>
      <property name="g:size">20,30</property>
      <property name="g:text">Preset Temperature</property>
    </style>
    <behavior>
      <rule>
        <condition>
          <op name="and">
            <event class="KeyListener.g:keypressed" part-name="set_window"/>
```

```
                <op name="equal">
                    <property event-class="KeyListener.g:keypressed" name="keyCode" />
                    <constant value="57343" />
                </op>
            </op>
        </condition>
        <action>
            <call name="AIR1App.set_window"/>
        </action>
        </rule>
    </behavior>
    </part>
</part>
</template>
<template id = "t1_mode_change" priority = "1">
    <part>
    <part class="G:Button" id="mode">
    <style>
        <property name="image-src">AIR1_resource_mode.jpg</property>
        <property name="g:size">20,30</property>
    </style>
    <behavior>
        <rule>
        <condition>
            <op name="and">
                <event class="KeyListener.g:keypressed" part-name="mode_change"/>
                <op name="equal">
                    <property event-class="KeyListener.g:keypressed" name="keyCode" />
                    <constant value="57344" />
                </op>
            </op>
        </condition>
        <action>
            <call name="AIR1App.mode_change"/>
        </action>
        </rule>
    </behavior>
    </part>
</part>
</template>
<template id = "t1_menu" priority = "5">
    <part>
    <part class="G:Button" id="menu">
    <style>
        <property name="image-src">AIR1_resource_menu.jpg</property>
        <property name="g:size">20,30</property>
    </style>
    <behavior>
        <rule>
        <condition>
            <op name="and">
                <event class="KeyListener.g:keypressed" part-name="menu"/>
                <op name="equal">
                    <property event-class="KeyListener.g:keypressed" name="keyCode" />
                    <constant value="57345" />
                </op>
            </op>
        </condition>
        <action>
            <call name="AIR1App.menu"/>
        </action>
        </rule>
    </behavior>
    </part>
</part>
</template>
<peers>
    <presentation base="XXX.uiml" />
    <logic id ="log1" source = "#t2_logic">
    </logic>
</peers>
</uiml>
```

Furthermore, the following is an extracted part of an exemplary AIR2_interface.uiml file, as the UI definition file when attribute whether the UI object constituting the air conditioner remocon UI is enabled/disabled is changed, as described with reference to FIG. 10 according to the third embodiment.

```
<template id = "t1_switch2" priority = "0">
    <part>
        <part class="G:Button" id="switchON">
        <style>
            <property name="image-
                src">AIR2_resource_switch2.jpg</property>
            <property name="g:size">30,30</property>
            <property name="g:text">Power ON</property>
        </style>
        <behavior>
            <rule>
            <condition>
                <op name="and">
                    <event class="KeyListener.g:keypressed"
                        part-name="switchON"/>
                    <op name="equal">
                        <property event-class=
                            "KeyListener.g:keypressed"
                            name="keyCode" />
                        <constant value="57398" />
                    </op>
                </op>
            </condition>
            <action>
                <call name="com_effect,change">
                    <param>set_up</param>
                    <param>set_down</param>
                    <param>mode_change</param>
                    <param>menu</param>
                    <param>switchOFF</param>
                </call>
            </action>
            </rule>
        </behavior>
        </part>
    </part>
</template>
```

Industrial Applicability

According to the present invention, a plurality of UIs are compounded into a single compound UI which fits in a predetermined UI display area, by automatically selecting necessary UI objects in response to operation of an application corresponding to each UI. Thereby, it is possible to use the plurality of UIs simultaneously without switching them. Moreover, since there is no need of operation to select the display area (window) or an operation to move a scroll bar in the display area unlike multi-window, it significantly reduces operational load of a user.

The invention claimed is:

1. A user interface generation apparatus comprising:
an application program execution unit for implementing a variety of functions based on an application program;
a user interface generation unit for generating a user interface for instructing the application program execution unit to execute a predetermined function based on the application program;
a display unit for displaying the user interface generated by the user interface generation unit; and
a memory unit for storing a user interface definition file including user interface object definition information for defining a user interface object which is a component of the user interface, wherein
when the user interface generation unit is instructed to generate a plurality of user interfaces, each of which can be used as a single user interface, the user interface generation unit makes a selection from the user interface object definition information included in the user interface definition file stored in the memory unit corresponding to each of the plurality of user interfaces instructed, and executes user interface compound processing to generate a compound user interface based on the user interface object definition information selected, the compound user interface including user interface objects from at least two different user interface definition files so as to include only operational user interface objects from at least two different user interfaces of the plurality of user interfaces, the at least two different user interfaces respectively having independent functions based on their application programs different from each other.

2. The user interface generation apparatus according to claim 1, wherein the user interface object definition information includes user interface object attribute information indicating a relationship between the user interface object and another user interface object included in the user interface including the user interface object, and
when the user interface generation unit is instructed to generate the plurality of user interfaces, the user interface generation unit makes a selection from the user interface object definition information based on a predetermined display area of the display unit for displaying the user interface and the user interface object attribute information.

3. The user interface generation apparatus according to claim 2, wherein the user interface object definition information further includes user interface object attribute information indicating whether each user interface object constituting the user interface is enabled or disabled, and
when the user interface generation unit is instructed to generate the plurality of user interfaces, the user interface generation unit makes a selection from the user interface object definition information based on a predetermined display area of the display unit for displaying the user interface and the user interface object attribute information.

4. The user interface generation apparatus according to claim 3 wherein the user interface definition file includes identification information to identify the user interface generated based on the user interface definition file, and
the user interface generation unit processes the user interface object definition information selected, based on the identification information.

5. The user interface generation apparatus according to claim 4, wherein the user interface object definition information includes action information indicating contents of operation to be executed at occurrence of an event to the user interface object,
the action information includes information on change in the user interface object attribute information included in another user interface object definition information, and
when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

6. The user interface generation apparatus according to claim 3, wherein the user interface object definition information includes action information indicating contents of operation to be executed at occurrence of an event to the user interface object, the action information includes information on change in the user interface object attribute information included in another user interface object definition information, and when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

7. The user interface generation apparatus according to claim 2 wherein the user interface definition file includes identification information to identify the user interface generated based on the user interface definition file, and the user interface generation unit processes the user interface object definition information selected, based on the identification information.

8. The user interface generation apparatus according to claim 7, wherein the user interface object definition information includes action information indicating contents of operation to be executed at occurrence of an event to the user interface object, the action information includes information on change in the user interface object attribute information included in another user interface object definition information, and when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

9. The user interface generation apparatus according to claim 2, wherein the user interface object definition information includes action information indicating contents of operation to be executed at occurrence of an event to the user interface object, the action information includes information on change in the user interface object attribute information included in another user interface object definition information, and when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

10. The user interface generation apparatus according to claim 1, wherein the user interface definition file includes identification information to identify the user interface generated based on the user interface definition file, and the user interface generation unit processes the user interface object definition information selected, based on the identification information.

11. The user interface generation apparatus according to claim 10, wherein the user interface object definition information includes action information indicating contents of operation to be executed at occurrence of an event to the user interface object, the action information includes information on change in the user interface object attribute information included in another user interface object definition information, and when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

12. The user interface generation apparatus according to claim 1, wherein the user interface object definition information includes action information indicating contents of operation to be executed at occurrence of an event to the user interface object, the action information includes information on change in the user interface object attribute information included in another user interface object definition information, and when the event occurs on the compound user interface and the user interface object attribute information is changed based on the action information included in the user interface object definition information of the user interface object which received occurrence of the event, the user interface generation unit executes user interface compound processing based on the user interface object attribute information changed, so as to generate a new compound user interface.

* * * * *